US012187048B2

(12) United States Patent
Miyahara et al.

(10) Patent No.: US 12,187,048 B2
(45) Date of Patent: Jan. 7, 2025

(54) LIQUID EJECTING DEVICE AND LIQUID EJECTING METHOD

(71) Applicant: KYOCERA CORPORATION, Kyoto (JP)

(72) Inventors: Takashi Miyahara, Kirishima (JP); Daisuke Hozumi, Kirishima (JP); Atsushi Ishihara, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 268 days.

(21) Appl. No.: 17/936,815

(22) Filed: Sep. 29, 2022

(65) Prior Publication Data

US 2023/0021666 A1 Jan. 26, 2023

Related U.S. Application Data

(63) Continuation of application No. PCT/JP2020/023551, filed on Jun. 16, 2020.

(30) Foreign Application Priority Data

Mar. 30, 2020 (JP) ................................ 2020-059471

(51) Int. Cl.
*B41J 2/185* (2006.01)
*B41J 2/175* (2006.01)

(52) U.S. Cl.
CPC ........... *B41J 2/185* (2013.01); *B41J 2/17596* (2013.01); *B41J 2002/1856* (2013.01)

(58) Field of Classification Search
CPC ............................ B41J 2/185; B41J 2/17596; B41J 2002/1856; B41J 2002/14225; B41J 2/14209; B41J 2002/14362; B41J 2002/14419; B41J 2002/14459; B41J 2202/03; B41J 2202/12; B41J 2/18; B41J 2/01
See application file for complete search history.

(56) References Cited

U.S. PATENT DOCUMENTS 10,166,775 B2 * 1/2019 Kobayashi ............ B41J 2/1433

FOREIGN PATENT DOCUMENTS

| | | | |
|---|---|---|---|
| EP | 3199354 | A1 | 8/2017 |
| JP | H8216425 | A | 8/1996 |
| JP | 2008149594 | A | 7/2008 |

* cited by examiner

*Primary Examiner* — Bradley W Thies
(74) *Attorney, Agent, or Firm* — HAUPTMAN HAM, LLP

(57) ABSTRACT

A liquid ejecting device includes a flow path member, an actuator, a pump, and a controller. The flow path member includes a flow path configured to direct flow of a pseudo-plastic liquid through the flow path member. The actuator is configured to cause droplets to be ejected. The pump is configured to cause the liquid to flow sequentially through a supply reservoir, a plurality of supply manifolds, a plurality of supply flow paths, and a plurality of pressure chambers. The controller is configured to adjust a flow rate of the liquid to a prescribed target flow rate. The flow path has a flow path shape in which an average viscosity of the liquid in the plurality of supply flow paths is less than or equal to half an average viscosity of the liquid in the plurality of supply manifolds when the flow rate is equal to the target flow rate.

23 Claims, 10 Drawing Sheets

LIQUID EJECTING DEVICE AND LIQUID EJECTING METHOD

PRIORITY CLAIM AND CROSS-REFERENCE TO RELATED APPLICATIONS

This application is a Continuation of International Patent Application No. PCT/JP2020/023551, filed on Jun. 16, 2020, which claims priority to Japanese Patent Application No. 2020-059471, filed on Mar. 30, 2020, each of which is hereby incorporated by reference in its entirety.

TECHNICAL FIELD

The present disclosure relates to a liquid ejecting device and a liquid ejecting method.

BACKGROUND OF INVENTION

Liquid ejecting devices such as inkjet printers are known. In Patent Literature 1, an inkjet recording device using a thixotropic ink is disclosed.

CITATION LIST

Patent Literature

Patent Literature 1: Japanese Unexamined Patent Application Publication No. 8-216425

SUMMARY

In an aspect of the present disclosure, a liquid ejecting device includes a flow path member, an actuator, and a flow rate setting unit. The flow path member includes a flow path along which a pseudoplastic liquid flows. The actuator applies pressure to the liquid in the flow path and cause droplets to be ejected from the flow path member. The flow rate setting unit sets the flow rate of the liquid in the flow path. The flow path includes a supply reservoir, a plurality of supply manifolds, a plurality of supply flow paths, a plurality of pressure chambers, a plurality of nozzles, a plurality of collection flow paths, and a collection reservoir. The liquid is supplied from the supply reservoir. The plurality of supply manifolds is connected to the supply reservoir and the liquid is supplied thereto from the supply reservoir. Two or more supply flow paths, among the plurality of supply flow paths, are provided for each of the plurality of supply manifolds. Each supply flow path among the plurality of supply flow paths is connected to a corresponding one of the plurality of supply manifolds. The liquid is supplied to the plurality of supply flow paths from the supply manifolds connected thereto. The plurality of pressure chambers is connected in a one-to-one manner to the plurality of supply flow paths, the liquid is supplied thereto from the plurality of supply flow paths, and pressure is applied to the liquid by the actuator. The plurality of nozzles is connected in a one-to-one manner to the plurality of pressure chambers and the liquid from the pressure chambers is ejected to the outside. The plurality of collection flow paths is connected in a one-to-one manner to the plurality of pressure chambers and collect the liquid from the plurality of pressure chambers. Each of the plurality of collection manifolds is connected to two or more of the plurality of collection flow paths and the plurality of collection manifolds collect the liquid from the plurality of collection flow paths. The collection reservoir is connected to the plurality of collection manifolds and collects the liquid from the plurality of collection manifolds. The flow rate setting unit adjusts the circulation flow rate of the liquid to a prescribed target flow rate, the liquid sequentially circulating through the supply reservoir, the plurality of supply manifolds, the plurality of supply flow paths, the plurality of pressure chambers, the plurality of collection flow paths, the plurality of collection manifolds, and the collection reservoir. The flow path has a flow path shape in which an average viscosity of the liquid in the supply flow paths is less than or equal to half an average viscosity of the liquid in the supply manifolds when the circulation flow rate is equal to the target flow rate.

In an aspect of the present disclosure, a liquid ejecting method uses the liquid ejecting device described above. In the liquid ejecting method, a pseudoplastic fluid whose viscosity is from 0.02 Pa·s to 0.4 Pa·s at a shear rate of 1000 $s^{-1}$ and whose viscosity is from 0.5 Pa·s to 50 Pa·s at a shear rate of 0.01 $s^{-1}$ is used as the liquid.

DESCRIPTION OF EMBODIMENTS

Figure 1:
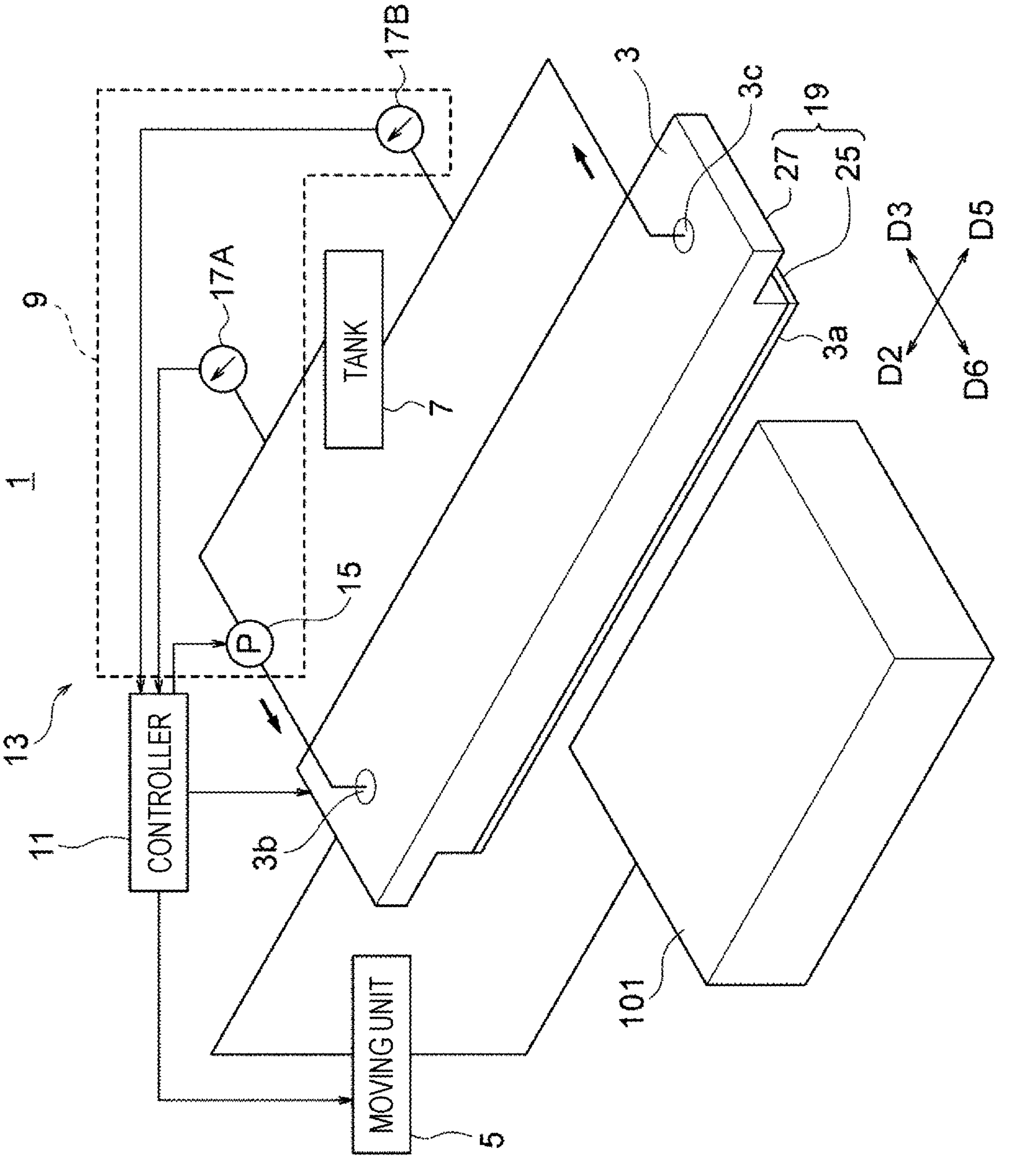
FIG. 1 is a schematic diagram illustrating the overall configuration of a liquid ejecting device according to an embodiment.

Embodiments of the present disclosure are described below while referring to the drawings. The following drawings are schematic drawings. Therefore, details may be omitted. In addition, the dimensional proportions do not necessarily correspond to the actual dimensional proportions. The dimensional proportions do not necessarily match each other from drawing to drawing. Certain dimensions may be depicted as being larger than they are in reality, and certain shapes may be depicted in an exaggerated manner.

The drawings may include arrows representing directions D1 to D6. These directions are parallel to an ejection surface 3$a$, which is described later. The directions D2 and D5 are, for example, parallel to a longitudinal direction of a head 3, which is described later, and are so-called main scanning directions from another perspective. The directions D3 and D6 are perpendicular to the directions D2 and D5. The directions D1 and D4 are inclined with respect to the directions D3 and D6.

(Overall Configuration of Liquid Ejecting Device)

FIG. 1 is a diagram schematically illustrating the main configuration of a liquid ejecting device 1 (hereinafter, may be referred to as "ejecting device 1") according to an embodiment.

The ejecting device 1 is configured as a device that deposits a liquid onto a surface of an object 101 by ejecting droplets from the ejection surface 3*a* of the head 3 towards the object 101, such as an inkjet printer, for example. The ejection surface 3*a* may face in any direction with respect to the vertical direction, but in the following description, for convenience, the direction in which the ejection surface 3*a* faces is a downward direction and terms such as upper surface or lower surface may be used.

The specific type (intended use) of the ejecting device 1 may be any appropriate type. For example, the ejecting device 1 may be a device that prints characters and figures (or from another perspective, records information) by depositing ink onto a recording medium (for example, paper) serving as the object 101. In other words, the ejecting device 1 may be a so-called printer. In addition, for example, the ejecting device 1 may be a device for decorating the body of an automobile by depositing paint onto the body of the automobile serving as the object 101. In addition, for example, the ejecting device 1 may be a device that forms wiring by depositing a liquid containing conductive particles onto a circuit board serving as the object 101.

Furthermore, unlike in the illustrated example, the ejecting device 1 does not have to be a device that deposits a liquid onto the object 101. For example, the ejecting device 1 may be a device that ejects into a container a liquid chemical that reacts with a substance inside the container, or may be a device that sprays a disinfectant solution into the air.

As is clear from the above examples of specific types of the ejecting device 1, the material, shape and dimensions of the object 101 may be chosen as appropriate. Since FIG. 1 is a schematic diagram, the object 101 is illustrated as a rectangular parallelepiped. The material of the object 101 may be, for example, paper, cloth, resin, metal, ceramic, wood, or a combination of any of these materials. Types of the object 101 may include recording media (for example, paper rolls or sheets), circuit boards, clothing, beverage containers, storage containers, electronic equipment housings, and automobile bodies. The object 101 or the area of the object 101 onto which the liquid is to be deposited may be narrower or wider than the ejection surface 3*a* from which droplets are ejected.

As is clear from the above examples of specific types of the ejecting device 1, the type of liquid may also be chosen as appropriate. For example, the types of liquids may include inks, paints, liquids containing conductive particles, chemicals, and disinfectants. Inks and paints may be distinguished from each other by the presence or absence of organic solvents and/or a function of protecting the surface of the object 101. However, such distinctions do not need to be made. In the following description, paint may be read as ink as appropriate. The reverse is also true. A paint may contain a pigment for the purpose of providing a color or may be pigment-free (colorless) without having the purpose of providing a color (for example, for the sole purpose of adding gloss and/or protecting the object 101).

The ejecting device 1, for example, includes the head 3 that ejects droplets and a moving unit 5 that moves the head 3 relative to the object 101. The head 3 has the ejection surface 3*a* in which a plurality of nozzles (which are described later) for ejecting droplets is formed. The moving unit 5, for example, maintains a state in which the ejection surface 3*a* and the surface of the object 101 face each other and moves the ejection surface 3*a* and the surface of the object 101 relative to each other along the ejection surface 3*a* and the surface of the object 101. The direction of relative movement is, for example, the direction D3 or D6. As can be understood from an inkjet printer, which is a specific example of the ejecting device 1, droplets are deposited across a region having a larger area than the area of the region where the plurality of nozzles is arranged as a result of droplets being ejected from the ejection surface 3*a* in synchronization with the relative movement described above.

The ejecting device 1 includes, for example, a tank 7 in which liquid is stored. The head 3 has a supply port 3*b* for allowing liquid to be supplied from the tank 7 to the head 3 and a collection port 3*c* for allowing liquid to be collected from the head 3 to the tank 7. In other words, the liquid circulates through the head 3 and the tank 7. Circulating the liquid in this way, for example, reduces the likelihood of the liquid stagnating inside the head 3. This, in turn, reduces the likelihood of the stagnating liquid solidifying or components in the stagnating liquid precipitating. In addition, in this embodiment, the shear rate of the liquid can be adjusted, and therefore the viscosity of the liquid can be adjusted, as described below, by circulating the liquid.

The ejecting device 1 includes a circulation actuation unit 9 that applies pressure to the liquid so as to cause the liquid to circulate and a controller 11 that controls the various parts (for example, the head 3, the moving unit 5, and the circulation actuation unit 9) of the ejecting device 1. The combination of the circulation actuation unit 9 and the controller 11 may be regarded as a flow rate setting unit 13 used to set the flow rate of the liquid circulating through the head 3 (hereinafter, referred to as the "circulation flow rate"). The circulation flow rate may be regarded, for example, as being the same as the flow rate of the liquid flowing from the collection port 3*c* to outside the head 3.

The ejecting device 1 may include only one head 3 (and tank 7) as in the case of a monochrome printer, or may include multiple heads 3 (and multiple tanks 7) that eject different liquids from each other like in the case of a color printer. The ejecting device 1 may also include multiple heads 3 that eject the same liquid as each other. There are advantages to providing a plurality of heads 3 that eject the same liquid such as, for example, a reduction in the time taken to deposit liquid on a certain area and an improvement in dot density. In the following description, only one head 3 will be referred to for convenience.

(Moving Unit)

The moving unit 5 can, for example, move the object 101 relative to the head 3 in at least one out of the directions D3 and D6. As has already been mentioned, this direction is the direction of movement when ejecting droplets and is a so-called sub-scanning direction. The moving unit 5 may be able to realize relative movement between the head 3 and the object 101 in directions other than the directions D3 and D6. Other directions in which relative movement may be realized include, for example, the directions D2 and D5, which are perpendicular to the directions D3 and D6, and directions perpendicular to the ejection surface 3*a* (a direction in which the head 3 and the object 101 are brought closer together and a direction in which the head 3 and the object 101 are moved away from each other). The moving unit 5 may also be capable of realizing relative rotation between the head 3 and the object 101.

The moving unit 5 may move only the object 101, the head 3, or both the object 101 and the head 3 in an absolute coordinate system. The specific configuration of the moving unit 5 may be appropriately decided upon in accordance with the specific type of the ejecting device 1.

For example, in the case where the ejecting device 1 is a so-called line printer, the moving unit 5 may be configured as a device for conveying a recording medium (for example, paper) as the object 101. The device may, for example, include a plurality of rollers that generates a frictional force by contacting the recording medium and an electric motor that causes the plurality of rollers to rotate. In the case where the ejecting device 1 is a so-called serial printer, for example, the moving unit 5 may include a device for conveying the recording medium as the object 101 in a prescribed conveyance direction and a device for moving the head 3 in a direction perpendicular to the conveyance direction and along the recording medium.

For example, the ejecting device 1 may include a conveyor belt that conveys any type of object 101. For example, the ejecting device 1 may include a movable table on which any type of object 101 is placed. For example, the ejecting device 1 may include an industrial robot that moves any type of object 101 and/or an industrial robot that moves the head 3. Examples of industrial robots may include vertical articulated robots (articulated robots in a narrow sense), SCARA robots, Cartesian robots, and parallel link robots.

(Tank and Circulation Actuation Unit)

The tank 7 and circulation actuation unit 9 may be, for example, the same as or similar to a tank and a circulation actuation unit used in known inkjet printers that circulate liquids, or may be components to which such known tanks and circulation actuation units have been applied.

For example, the tank 7 may be configured to store the liquid to be supplied to the head 3 and the liquid collected from the head 3 in the same space. The tank 7 may also be configured to store the liquid to be supplied to the head 3 and the liquid collected from the head 3 in separate spaces and allow the liquid to flow from the latter space to the former space. In this case, the tank 7 may include two spaces realized by partitioning one tank with a partition wall or may include two spaces realized by including two tanks connected to each other by flow paths. The inside of the tank 7 (the space mentioned above) may be open to the atmosphere or sealed. In the latter case, the pressure inside the tank 7 may be adjusted to a suitable pressure using a valve or vacuum pump, for example. The tank 7 may include a main tank and a sub-tank having a smaller capacity than the main tank. The sub-tank functions as an intermediary between the main tank and the head 3.

In the illustrated example, the circulation actuation unit 9 includes a pump 15 that pumps the liquid from the tank 7 to the head 3, a pressure sensor 17A that detects the pressure of the liquid on the side near the supply port 3*b*, and a pressure sensor 17B that detects the pressure of the liquid on the side near the collection port 3*c*. The controller 11, for example, performs feedback control on the pump 15 so that the pressure difference between the supply port 3*b* and the collection port 3*c* converges at a prescribed target value on the basis of the values detected by the pressure sensors 17A and 17B. Thus, the circulation flow rate is subjected to feedback control so that the circulation flow rate becomes the target flow rate.

Unlike in the illustrated example, a pump 15 that pumps the liquid from the collection port 3*c* to the tank 7 may be provided instead of or in addition to the pump 15 on the side near the supply port 3*b*. Instead of or in addition to the pump 15 pumping the liquid, liquid flow may be generated by controlling the pressure inside the tank 7 by using a vacuum pump or the like. Liquid flow may be generated by raising the liquid level in the tank containing the liquid to be supplied so as to be higher than the liquid level in the tank storing the collected liquid.

Instead of or in addition to the pressure sensors 17A and 17B, flow rate sensors may be provided in order to detect the flow rate of the liquid supplied to the head 3 and/or the flow rate of the liquid collected from the head 3 and may be used in control of the circulation flow rate. As is understood from the various ways in which the liquid flow may be generated described above, instead of or in addition to these sensors, a sensor that detects the air pressure inside the tank 7 may be provided and used in control of the circulation flow rate. Open-loop control may be used without performing sensor-based feedback control. In other words, sensors do not have to be provided.

For example, the tank 7 and the circulation actuation unit 9 are not moved in an absolute coordinate system by the moving unit 5. Therefore, for example, in a mode in which the moving unit 5 moves the head 3 in the absolute coordinate system, the head 3 moves relative to the tank 7 and the circulation actuation unit 9. In this case, the head 3, the tank 7, and the circulation actuation unit 9 may be connected to each other by flow paths consisting of, for example, flexible tubing. In a mode in which the moving unit 5 does not move the head 3 in the absolute coordinate system, the head 3 is fixed in place with respect to the tank 7 and the circulation actuation unit 9. In this case, the configuration of the flow paths connecting the head 3, the tank 7, and the circulation actuation unit 9 to each other may be chosen as appropriate. Unlike in the above description, all or part of the tank 7 and/or the circulation actuation unit 9 may move together with the head 3.

(Controller)

The controller 11 consists of, for example, a computer, a Field Programmable Gate Array (FPGA), an Application Specific Integrated Circuit (ASIC), any other forms of circuitry, etc. Although not specifically illustrated, the computer includes a central processing unit (CPU), a read only memory (ROM), a random access memory (RAM), and an external storage device. The head 3, the moving unit 5, and the circulation actuation unit 9 are controlled by executing programs stored in the ROM and/or external storage device.

(Head)

Figure 2A:
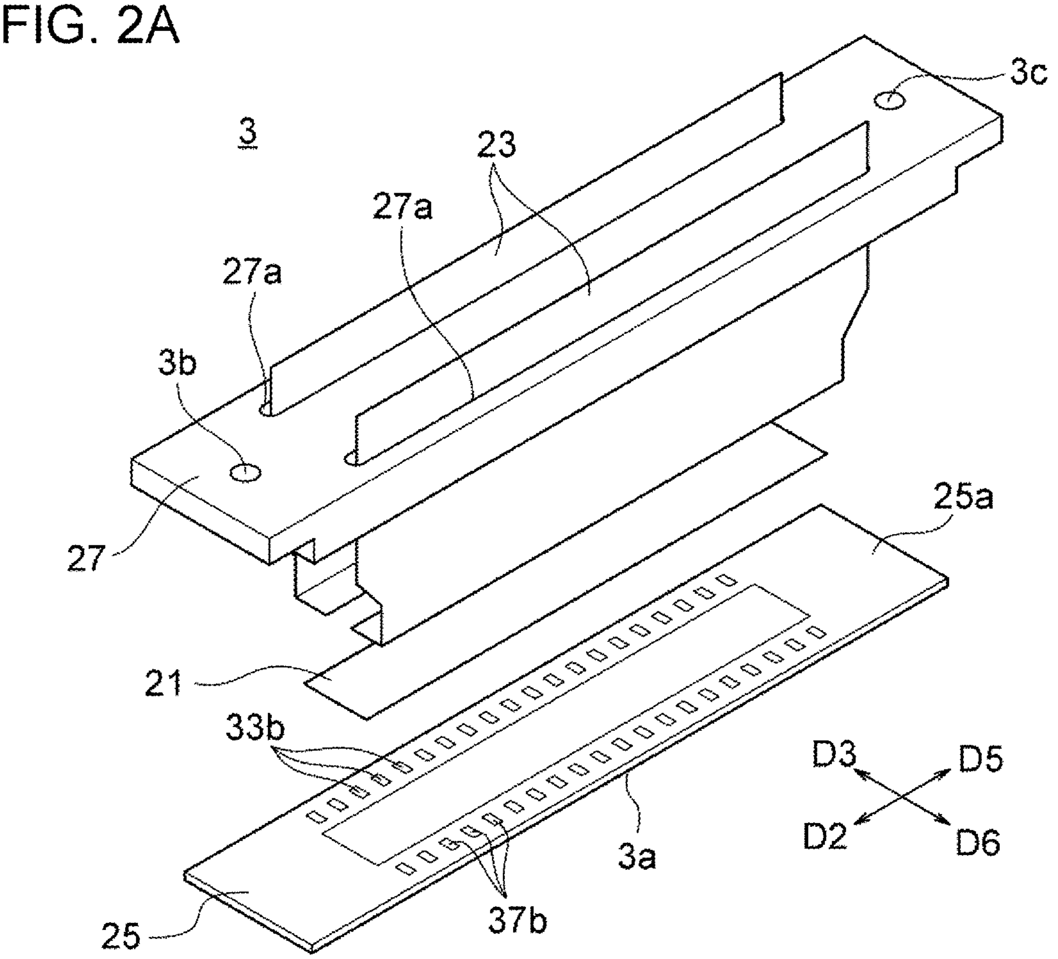
FIG. 2A is an exploded perspective view of a head of the liquid ejecting device of the embodiment.

FIG. 2A is an exploded perspective view of the head 3.

The head 3 includes a flow path member 19 (reference symbol appears in FIG. 1), which has a flow path along which the liquid flows, an actuator 21 that applies pressure to the liquid in the flow path member 19, and signal transmission members 23 for inputting drive signals to the actuator 21 (not illustrated in FIG. 1). The flow path member 19 includes a first flow path member 25 having the ejection surface 3*a* and a second flow path member 27 including the supply port 3*b* and the collection port 3*c*. The surface of the first flow path member 25 on the opposite side from the ejection surface 3*a* may be referred to as a pressurized surface 25*a*.

The first flow path member 25 and the second flow path member 27 are formed in roughly flat plate like shapes and together form the roughly flat plate-shaped flow path member 19 when stacked one on top of the other. Liquid supplied to the supply port 3*b* is supplied from the second flow path member 27 to the first flow path member 25 and is then ejected from the ejection surface 3*a*. The remaining liquid that is not ejected flows from the first flow path member 25 to the second flow path member 27 and is collected from the collection port 3*c*.

The controller 11 outputs a control signal on the basis of prescribed data such as image data. The control signal is input, for example, via the signal transmission members 23, to a driver, which is not illustrated, mounted on the signal transmission members 23. The driver generates a drive signal having a predetermined waveform on the basis of the input control signal. The drive signal is input to the actuator 21 via the signal transmission members 23. The actuator 21 applies pressure to the liquid inside the flow path member 19 with a pressure waveform corresponding to the waveform of the drive signal. As a result, the liquid inside the flow path member 19 is ejected from the ejection surface 3*a*. The division of roles between the controller 11 and the driver may be decided upon as appropriate, and the driver may be regarded as being part of the controller 11.

(Second Flow Path Member, Supply Reservoir, and Collection Reservoir)

Figure 2B:
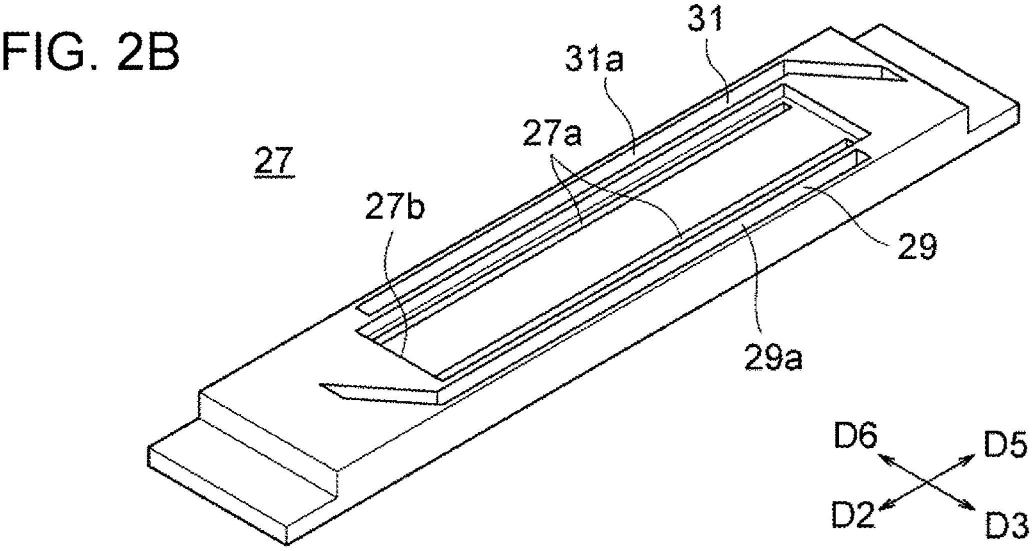
FIG. 2B is a perspective view of a second flow path member included in the head.
Figure 3A:
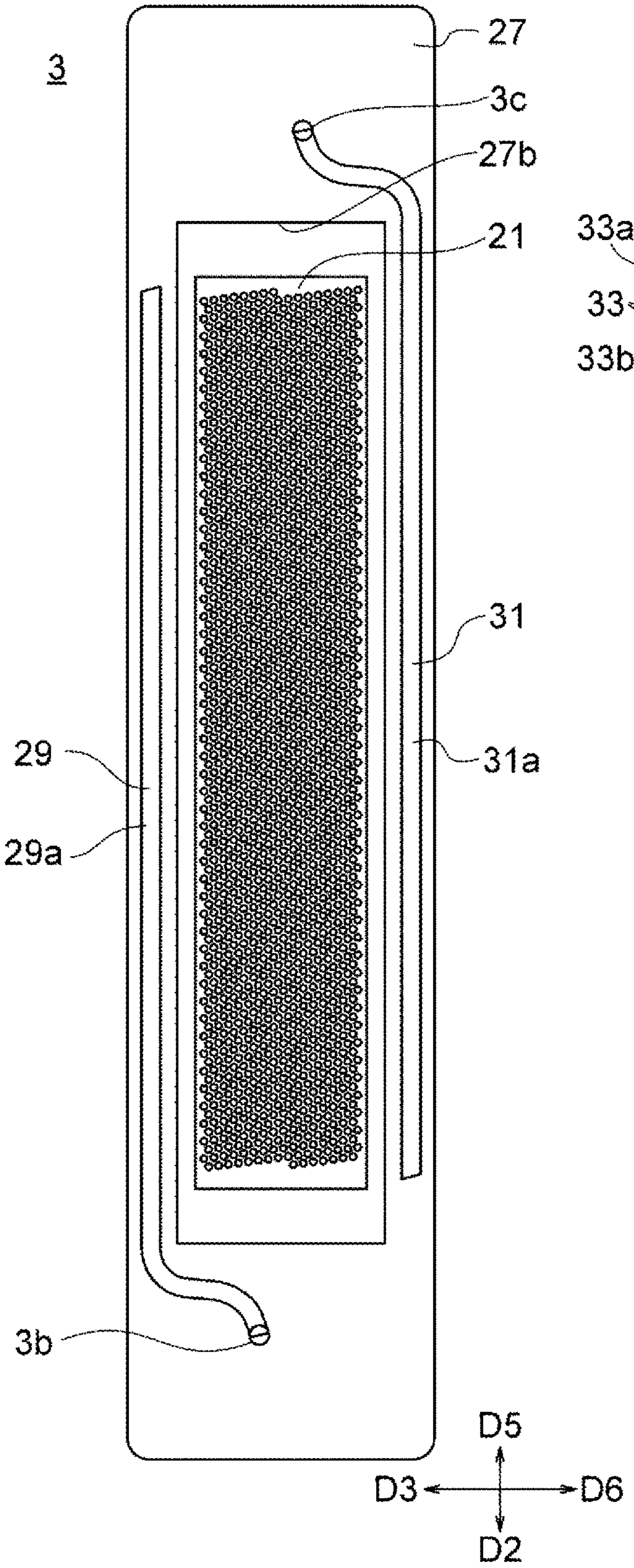
FIGS. 3A and 3B are planar see-through views of the head according to the embodiment.

FIG. 2B is a perspective view of the second flow path member 27. More precisely, this figure is a view of the second flow path member 27 from the side where the first flow path member 25 is located, and the upper side of the sheet in FIG. 2B corresponds to the lower side of the sheet in FIGS. 1 and 2A. FIG. 3A is a planar see-through view of the head 3 seen from the opposite side from the side where the ejection surface 3*a* is located. In this figure, the shape of the second flow path member 27 and the actuator 21 are illustrated.

As illustrated in FIG. 2B, the second flow path member 27 has two grooves (refer to reference symbols 29 and 31) formed in the surface on the side where the first flow path member 25 is located. These two grooves are blocked by the first flow path member 25 and form a supply reservoir 29 and a collection reservoir 31 illustrated in FIGS. 2B and 3A. The supply reservoir 29 leads to the supply port 3*b* and is a flow path that supplies liquid supplied to the supply port 3*b* to the flow path of the first flow path member 25. The collection reservoir 31 leads to the collection port 3*c* and is a flow path that collects liquid from the flow path of the first flow path member 25 and guides the collected liquid to the collection port 3*c*.

The supply reservoir 29 and the collection reservoir 31 include, for example, portions (main portions 29*a* and 31*a*) that extend in a straight line along the longitudinal direction (directions D2 and D5) of the head 3. The main portions 29*a* and 31*a* have, for example, lengths that span the length, in the longitudinal directions (directions D2 and D5), of the region in which a plurality of nozzles (described later) is arranged (refer to the arrangement region of the actuator 21 in FIG. 3A). The main portion 29*a* and 31*a* are located on opposite sides from each other in the lateral direction of the head 3 (directions D3 and D6) with respect to the arrangement region of the plurality of nozzles. In the description of the embodiments, for convenience, the shapes, dimensions, and so forth of the supply reservoir 29 and the collection reservoir 31 may be described while focusing only on the main portions 29*a* and 31*a*.

The supply port 3*b*, for example, leads to one end (the end in the direction D2) of the supply reservoir 29. The other end (the end in the direction D5) of the supply reservoir 29 is a dead end (in other words, closed). The liquid in the supply reservoir 29 flows in the direction from the one end to the other end (in the direction D5). The collection port 3*c*, for example, leads to one end (in the direction D5) of the collection reservoir 31. The other end of the collection reservoir 31 (the end in the direction D2) is a dead end (in other words, closed). The liquid in the collection reservoir 31 flows in the direction from the other end to the one end (in the direction D5). The direction in which the liquid in the supply reservoir 29 flows and the direction in which the liquid in the collection reservoir 31 flows are identical to each other in the illustrated example. However, these directions may instead be opposite to each other.

The supply reservoir 29 may include only the main portion 29*a* or may additionally include other portions. In the illustrated example, the supply reservoir 29 includes a portion (reference symbol omitted) that extends from the main portion 29*a* diagonally in the longitudinal direction of the head 3 to the supply port 3*b*. Similarly, the collection reservoir 31 may include only the main portion 31*a* or may additionally include other portions. In the illustrated example, the collection reservoir 31 includes a portion (reference symbol omitted) that extends diagonally in the longitudinal direction of the head 3 from the main portion 31*a* to the collection port 3*c*.

The cross-sectional shapes and dimensions of the supply reservoir 29 and the collection reservoir 31 (for example, of the main portions 29*a* and 31*a* thereof) may be constant regardless of the position along the longitudinal directions of these flow paths or may vary with position. In the description of the embodiments, the former may be taken as an example. The cross-sectional shapes may be an appropriate shape such as a rectangular shape. The various dimensions of the supply reservoir 29 and the collection reservoir 31 may be set as appropriate in accordance with the specific technical field to which the ejecting device 1 is to be applied.

In the illustrated example, in addition to the two grooves serving as the supply reservoir 29 and the collection reservoir 31, the second flow path member 27 has slits 27*a* (FIGS. 2A and 2B) through which the signal transmission members 23 are inserted and a recess 27*b* (FIGS. 2B and 3A) in which the actuator 21 is housed. The slits 27*a*, for example, penetrate through the second flow path member 27 from the side where the first flow path member 25 is located to the opposite side and extend along the longitudinal direction of the head 3. The recess 27*b* has a planar shape that is, for example, one size larger than the actuator 21, and the planar shape is a rectangular shape having a longitudinal direction matching the longitudinal direction of the head 3 in the illustrated example.

The material and so forth of the second flow path member 27 may be chosen as appropriate. For example, the second flow path member 27 may be composed of a metal, a resin, a ceramic, or a combination of any of these materials.

(First Flow Path Member)

Figure 3B:
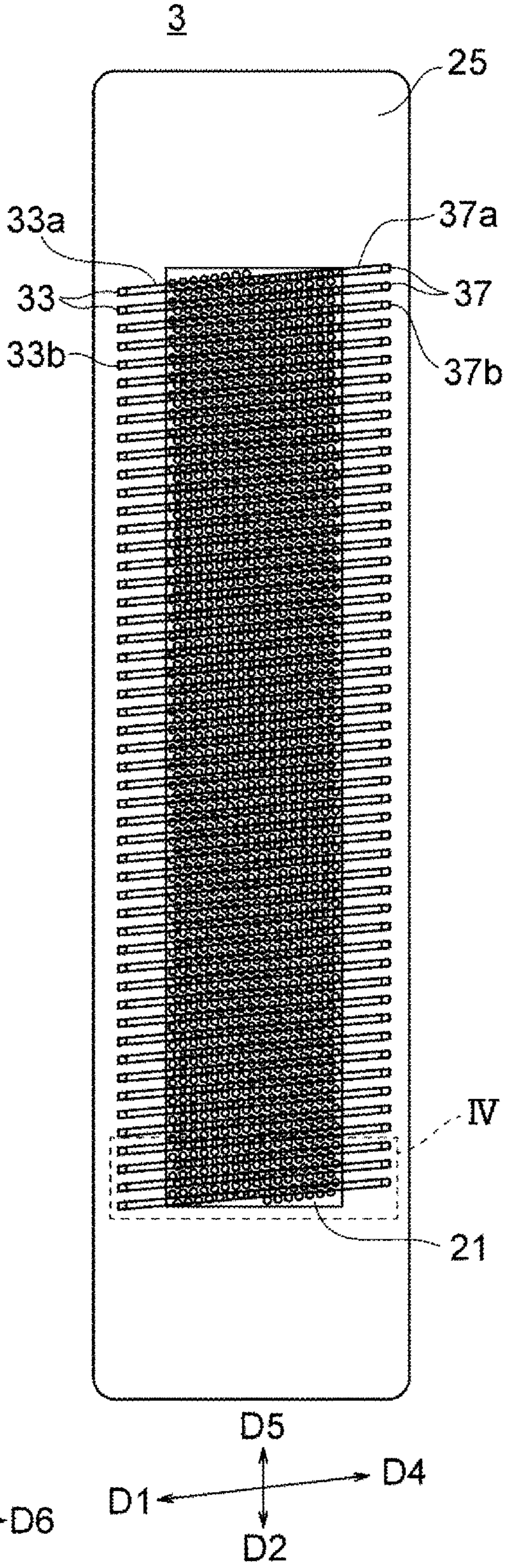
Figure 4:
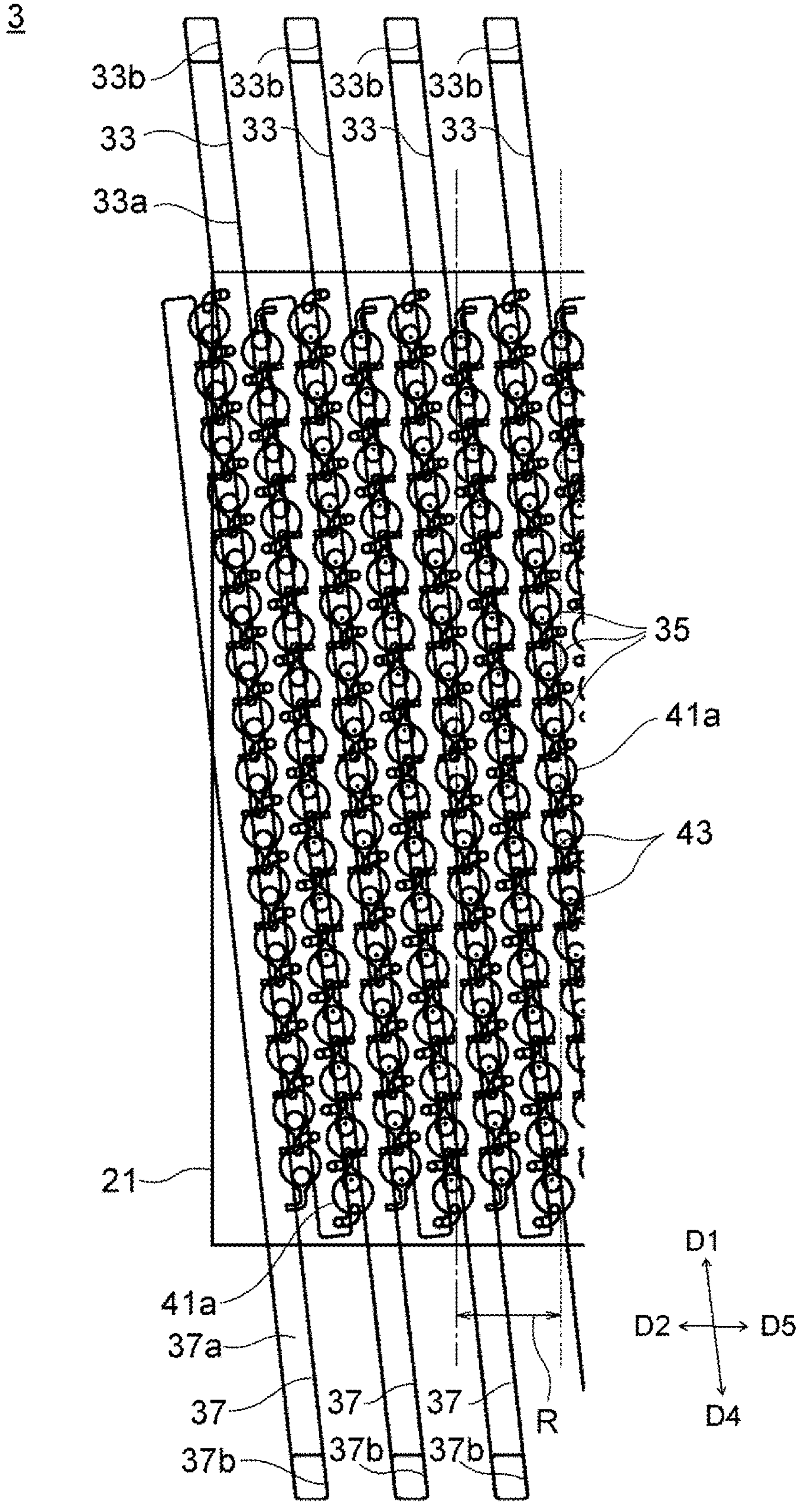
FIG. 4 is an enlarged view of a region IV in FIG. 3B.

FIG. 3B is a planar see-through view of the head 3. In this figure, the shape of the first flow path member 25 and the actuator 21 are illustrated. FIG. 4 is an enlarged view of a region IV in FIG. 3B.

The flow path of the first flow path member 25 includes a plurality of supply manifolds 33 into which liquid is supplied from the supply reservoir 29 and a plurality of individual flow paths 35 into which liquid is supplied from the supply manifolds 33. The individual flow paths 35 include nozzles (described later) that eject droplets from the ejection surface 3*a*. The flow path of the first flow path member 25 also includes a plurality of collection manifolds 37 that collects liquid from the plurality of individual flow paths 35 and guides the collected liquid to the collection reservoir 31.

Although not specifically illustrated, the first flow path member 25 may include other flow paths that are located in the directions D2 and D5 relative to the plurality of supply manifolds 33, the plurality of individual flow paths 35, and the plurality of collection manifolds 37 and that connect the supply reservoir 29 and the collection reservoir 31 to each other. Such flow paths contribute to, for example, making the temperature of the first flow path member 25 uniform.

(Manifolds)

The supply manifolds 33 include, for example, main portions 33*a* (corresponding to the entirety of the supply manifolds 33 in the illustrated example) that extend in straight lines along the direction D4 from the side near the supply reservoir 29 to the side near the collection reservoir 31. The direction D4 is inclined with respect to the lateral direction of the head 3 (direction D6). Similarly, the collection manifolds 37 include, for example, main portions 37*a* (corresponding to the entirety of the collection manifolds 37 in the illustrated example) that extend in straight lines along the direction D1 from the side near the collection reservoir 31 to the side near the supply reservoir 29. The direction D1 is inclined with respect to the lateral direction of the head 3 (direction D3). In the description of the embodiments, the shape, dimensions, and so forth of the supply manifolds 33 and the collection manifolds 37 may be described while focusing only on the main portions 33*a* and 37*a* for convenience.

One ends (the ends in the direction D1) of the supply manifolds 33 overlap the supply reservoir 29 in the planar see-through view. The one ends lead to the supply reservoir 29 via openings 33*b* in a surface of the first flow path member 25 on the side where the second flow path member 27 is located. The other ends of the supply manifolds 33 (the ends in the direction D4) are dead ends. Therefore, the liquid in the supply reservoir 29 is supplied to the one ends of the supply manifolds 33 through the openings 33*b* and flows through the insides of the supply manifolds 33 in the direction from the one ends to the other ends of the supply manifolds 33 (direction D4).

One ends (the ends in the direction D4) of the collection manifolds 37 overlap the collection reservoir 31 in the planar see-through view. The one ends lead to the collection reservoir 31 via openings 37*b* in a surface of the first flow path member 25 on the side where the second flow path member 27 is located. The other ends (ends in the direction D1) of the collection manifolds 37 are dead ends. Therefore, the liquid in the collection manifolds 37 flows in the direction from the other ends to the one ends (direction D4) and is collected in the collection reservoir 31 through the openings 37*b*.

The supply manifolds 33 and the collection manifolds 37 have lengths that span the length, in the lateral directions (directions D3 and D6), of the region in which the plurality of nozzles is arranged (described later) (refer to the arrangement region of the actuator 21). The ends of the supply manifolds 33 on the side near the collection reservoir 31 (the ends in the direction D4) are located, for example, nearer the supply reservoir 29 than the collection reservoir 31. Similarly, the ends of the collection manifolds 37 on the side near the supply reservoir 29 (the ends in the direction D1) are located, for example, nearer the collection reservoir 31 than the supply reservoir 29.

For example, in the plurality of supply manifolds 33, the supply manifolds 33 have identical configurations to each other and are arranged at a constant pitch along the direction D2. In other words, the supply manifolds 33 extend parallel to each other and have the same length. The positions at which the supply manifolds 33 are connected to the supply reservoir 29 (openings 33*b*) are arranged at a constant pitch along the supply reservoir 29.

Similarly, in the plurality of collection manifolds 37, for example, the collection manifolds 37 have identical configurations and are arranged at a constant pitch along the direction D2. In other words, the collection manifolds 37 extend parallel to each other and have the same length. The positions at which collection manifolds 37 are connected to the collection reservoir 31 (openings 37*b*) are arranged at a constant pitch along the collection reservoir 31.

The plurality of supply manifolds 33 and the plurality of collection manifolds 37 are, for example, arranged in an alternating manner at a constant pitch. The supply manifolds 33 and the collection manifolds 37 are adjacent to each other and extend parallel to each other. More specifically, the major portions of the supply manifolds 33, except for the upstream parts thereof, and the major portions of the collection manifolds 37, except for the downstream parts thereof, are adjacent to each other in the region where the plurality of nozzles is arranged.

The cross-sectional shapes and dimensions of the supply manifolds 33 and the collection manifolds 37 (for example, the main portions 33*a* and 37*a* thereof) may be constant regardless of the position along the longitudinal directions of these flow paths or may vary with position. In the description of the embodiments, the former may be taken as an example. The cross-sectional shapes may be an appropriate shape such as a rectangular shape. The various dimensions of the supply manifolds 33 and the collection manifolds 37 may be set as appropriate in accordance with the specific technical field to which the ejecting device 1 is to be applied.

(Individual Flow Paths)

The individual flow paths 35, for example, are roughly located between the supply manifolds 33 and the collection manifolds 37, which are adjacent to each other, and are connected to both the supply manifolds 33 and the collection manifolds 37. A plurality of individual flow paths 35 is provided for each set of manifolds (33 and 37). The individual flow paths 35 of the plurality of individual flow paths 35 connected to the same manifolds (33 and 37) are arranged along the manifolds (along the direction D1) at a certain pitch, for example, so as to form a single row of flow paths. The plurality of individual flow paths 35 is arranged in a matrix-like arrangement by arranging a plurality of rows of flow paths in the direction D2. Unlike in the illustrated example, two or more rows of individual flow paths 35 may be provided between adjacent supply and collection manifolds 33 and 37.

Within a single flow path row, the individual flow paths 35 of the plurality of individual flow paths 35 basically have identical configurations. The configurations of the plurality of rows of flow paths are basically the same as or similar to each other. However, for example, the orientations of the individual flow paths 35 may be different between adjacent rows of flow paths (illustrated example). In addition, for example, within a single row of flow paths, the shapes and/or dimensions of the plurality of individual flow paths 35 may slightly vary from one another. Among the plurality of rows of flow path, the flow path rows located at the end in the direction D2 and at the end in the direction D5 may include so-called dummy individual flow paths that do not eject droplets.

The individual flow paths 35 include nozzles 43 that are open at the ejection surface 3*a* and eject droplets. Rows composed of a plurality of nozzles 43 arranged in the direction D1 are referred to as nozzle rows. The direction in which the nozzles 43 are arranged within each nozzle row (direction D1) is inclined with respect to the direction of relative movement of the head 3 with respect to the object 101 (direction D3). The nozzles 43 belonging to the same nozzle row are located at different positions from each other in the direction D2 due to this inclination. In addition, the nozzle rows partially overlap each other in the direction D3. In these overlapping portions, the nozzles 43 of one nozzle row and the nozzles 43 of another nozzle row are located at different positions in the direction D2. When the plurality of nozzles 43 is projected in the direction D3, the nozzles 43 are lined up at substantially constant intervals in the direction D2.

This allows a plurality of dots to be formed on the surface of the object 101, the dots being arrayed in the direction D2 at a pitch that is smaller than the distance between the nozzles 43 that are adjacent to each other in the head 3. For example, thirty-two nozzles 43 are projected within the range of a virtual straight line R and the nozzles 43 are arrayed at intervals of 360 dpi within the range of the virtual straight line R. Thus, printing can be performed with a resolution of 360 dpi when the object 101 and the head 3 are moved relative to each other in a direction perpendicular to the virtual straight line R and droplets are ejected.

Figure 5:
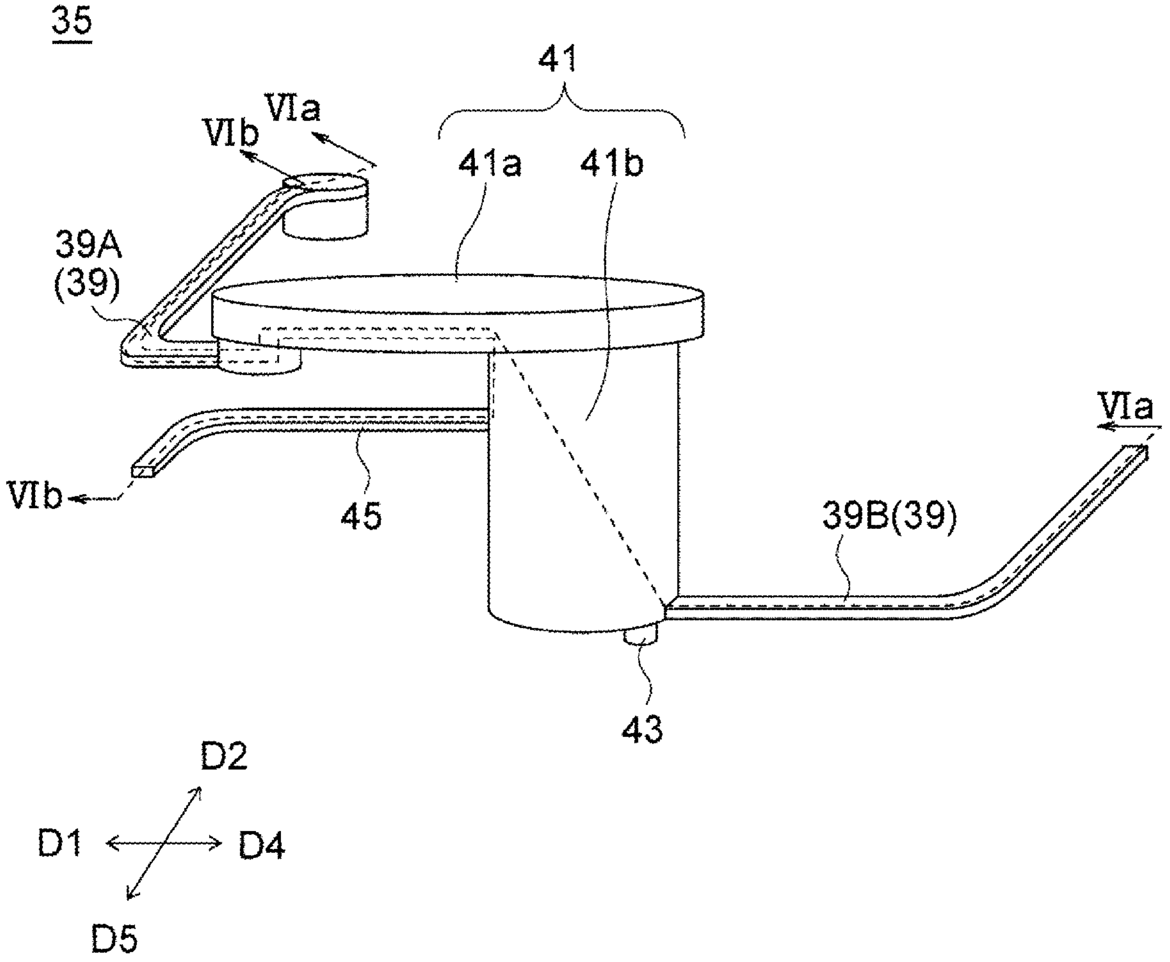
FIG. 5 is a perspective view of an individual flow path of the head according to the embodiment.
Figure 6A:
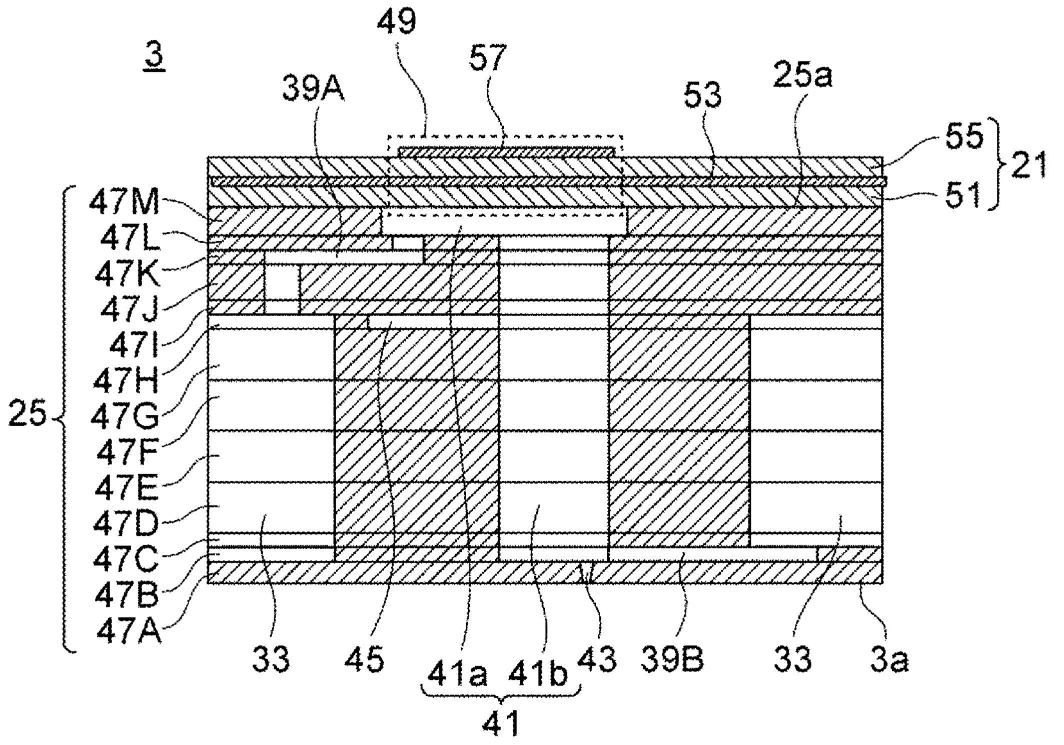
FIG. 6A is a cross-sectional view taken along a line VIa-VIa in FIG. 5.
Figure 6B:
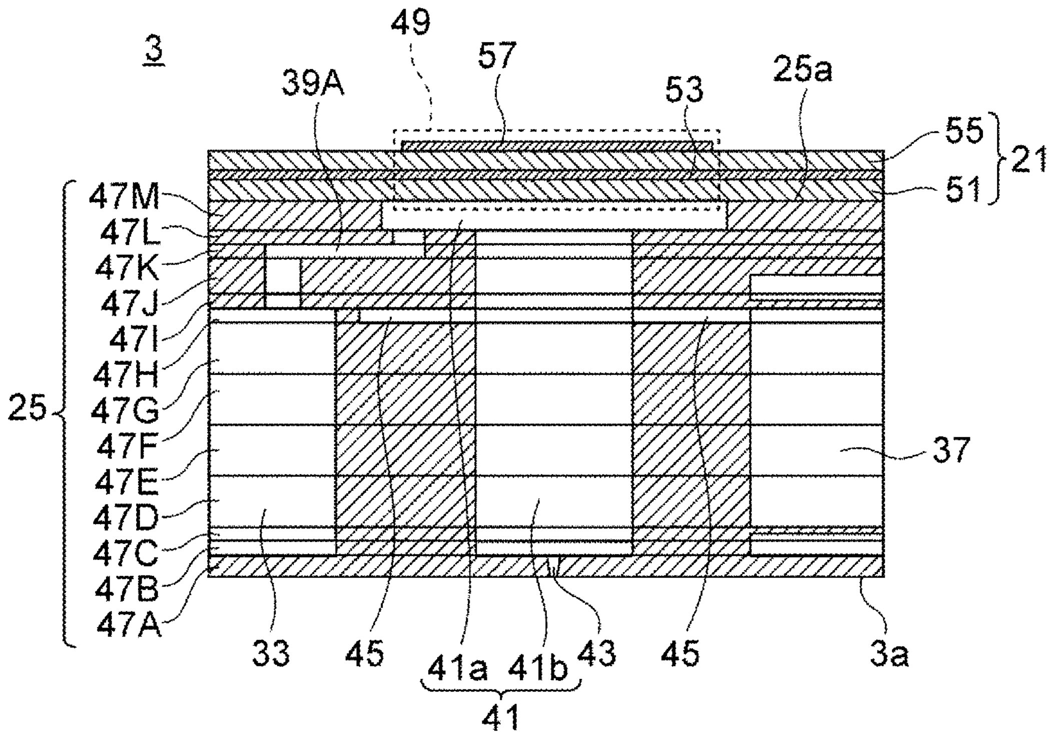
FIG. 6B is a cross-sectional view taken along a line VIb-VIb in FIG. 5.

FIG. 5 is a perspective view of one individual flow path 35. FIGS. 6A and 6B are cross-sectional views of the first flow path member 25 and the actuator 21. FIG. 6A corresponds to a line VIa-VIa in FIG. 5. FIG. 6B corresponds to a line VIb-VIb in FIG. 5.

The individual flow path 35 includes, for example, supply flow paths 39 (first supply flow path 39A and second supply flow path 39B) connected to the corresponding supply manifold 33, a pressure chamber 41 connected to the supply flow paths 39, and a nozzle 43 connected to the pressure chamber 41. As has already been described, the nozzle 43 opens at the ejection surface 3*a* and leads to outside the first flow path member 25. Liquid from the supply manifold 33 is supplied to the nozzle 43 via the supply flow paths 39 and the pressure chamber 41. Then, when pressure is applied to the pressure chamber 41 by the actuator 21, a droplet is ejected from the nozzle 43. The individual flow path 35 also includes the collection flow path 45 connecting the pressure chamber 41 and the corresponding collection manifold 37 to each other. Liquid remaining in the pressure chamber 41 without being ejected is collected from the collection flow path 45 to the collection manifold 37.

The pressure chamber 41 includes, for example, a pressure chamber body 41*a* to which pressure is applied by the actuator 21 and a descender 41*b* that connects the pressure chamber body 41*a* to the nozzle 43.

The pressure chamber body 41*a*, for example, is open to the pressurized surface 25*a* of the first flow path member 25 and is blocked by the actuator 21. Pressure is applied to the liquid inside the pressure chamber body 41*a* when the actuator 21 bends and deforms upward and/or downward. The descender 41*b* extends from the lower surface of the pressure chamber body 41*a* towards the ejection surface 3*a*. The cross-sectional area of the descender 41*b* is smaller than the area of a cross section of the pressure chamber body 41*a* parallel to the pressurized surface 25*a*.

The shape and dimensions of the pressure chamber body 41*a* may be set as appropriate. In the illustrated example, the pressure chamber body 41*a* has a circular planar shape. Unlike in the illustrated example, the planar shape of the pressure chamber body 41*a* may be a shape other than a circle, such as an ellipse or a rhombus, for example. The pressure chamber body 41*a* has a thin shape having a thickness that is smaller than the diameter in plan view. In the illustrated example, the shape and dimensions of a cross section of the pressure chamber body 41*a* parallel to the pressurized surface 25*a* are constant in the vertical direction. However, the shape and/or dimensions of the cross section of the pressure chamber body 41*a* may be different at different positions in the vertical direction.

The shape and dimensions of the descender 41*b* may also be set as appropriate. In the illustrated example, the shape of the descender 41*b* is a straight column. In the illustrated example, the cross-sectional shape is circular. Unlike in the illustrated example, the descender 41*b* may be inclined with respect to the vertical direction or may vary in diameter with respect to position in the vertical direction. The cross-sectional shape may be a shape other than a circular shape such as an elliptical shape.

The position at which the descender 41*b* is connected to the pressure chamber body 41*a* in plan view may also be chosen as appropriate. In the illustrated example, the descender 41*b* is connected adjacent to the outer edge of the circular pressure chamber body 41*a*. Unlike in the illustrated example, when the pressure chamber body 41*a* has an oval or diamond shape, for example, the descender 41*b* may be connected to an end of the pressure chamber body 41*a* in the longitudinal direction.

The nozzle 43 opens at a portion of the bottom surface of the descender 41*b*. The nozzle 43 may, for example, open at the center of the bottom surface of the descender 41*b* or may open at a position spaced away from the center of the bottom surface of the descender 41*b* (example illustrated in the figures). The shape of a longitudinal section of the nozzle 43 is tapered, with the diameter decreasing toward the ejection surface 3*a*. However, part or the entirety of the nozzle 43 may be reverse tapered. The shape of the cross section of the nozzle 43 is, for example, circular.

The supply flow paths 39 include, for example, the first supply flow path 39A and the second supply flow path 39B. Unlike in the illustrated example, the supply flow paths 39 may include only one out of the first supply flow path 39A and the second supply flow path 39B. The positions at which the supply flow paths 39 are connected to the supply manifold 33 and the pressure chamber 41, and the shapes and dimensions of the supply flow paths 39 may be chosen as appropriate. In the illustrated example, the following is illustrated.

The first supply flow path 39A connects the supply manifold 33 to the pressure chamber body 41A. The first supply flow path 39A extends upward from the upper surface of the supply manifold 33, then extends in the direction D5, then extends in the direction D4, and then extends upward again so as to connect to the lower surface of the pressure chamber body 41*a*. The cross-sectional shape and dimensions of the first supply flow path 39A are generally constant across the majority (for example, 60% or more) of the length of the first supply flow path 39A. The shape of the cross section across the majority of the length is rectangular.

The second supply flow path 39B connects the supply manifold 33 to the descender 41*b*. The second supply flow path 39B extends from the lower surface of the supply manifold 33 in the direction D5 and then in the direction D1, and is connected to a side surface of the descender 41*b*. The cross-sectional shape and dimensions of the second supply flow path 39B are generally constant across the majority (for example, 60% or more) of the length of the second supply flow path 39B. The shape of the cross section across the majority of the length is rectangular.

Only one collection flow path 45 is provided in a single individual flow path 35, for example. Unlike in the illustrated example, two or more collection flow paths 45 may be provided. The position at which the collection flow path 45 is connected to the collection manifold 37, the position at which the collection flow path 45 is connected to the pressure chamber 41, and the shape and dimensions of collection flow path 45 may be chosen as appropriate. In the illustrated example, the following is illustrated.

The collection flow path 45 connects the collection manifold 37 to descender 41*b*. The collection flow path 45 extends from a side surface of the collection manifold 37 in the direction D2 and then in the direction D4 before connecting to a side surface of the descender 41*b*. The shape and dimensions of the cross section of the collection flow path 45 are generally constant across the majority (for example, 60% or more) of the length of the collection flow path 45. The shape of the cross section across the majority of the length is rectangular.

As has already been described, individual flow paths 35 of a plurality of individual flow paths 35 connected to the same supply manifold 33 and the same collection manifold 37 are arranged at a constant pitch along the manifolds. Therefore, the positions at which the first supply flow paths 39A are connected to the supply manifold 33 are aligned at a constant pitch along the supply manifold 33. The same is true for the positions at which the second supply flow paths 39B are connected to the supply manifold 33 and the positions at which the collection flow paths 45 are connected to the collection manifold 37.

As illustrated in FIGS. 6A and 6B, the first flow path member 25 is formed by stacking a plurality of plates 47A to 47M. The various flow paths of the first flow path member 25 consist of holes or recesses formed in the plates 47A to 47M. The plurality of plates 47A to 47M may be formed of a metal or a resin, for example. In the example illustrated in FIG. 6B, dampers (reference symbols omitted) are provided above and below the collection manifold 37.

As has already been mentioned, the pressure chamber 41 is open at the pressurized surface 25*a*. Unlike in the illustrated example, a plate may be provided in order to close the pressure chamber 41. However, this case can be regarded as a question of whether a plate closing the pressure chamber 41 is regarded as being part of the first flow path member 25 or as being part of the actuator 21. In the description of the present disclosure, such a plate will be considered as being part of the actuator 21.

(Actuator)

As illustrated in FIG. 2A, the actuator 21 is, for example, a roughly flat plate-shaped member, and is bonded to the pressurized surface 25*a* of the first flow path member 25 (more precisely, the area indicated by the dotted line in FIG. 2A). As illustrated in FIGS. 6A and 6B, the actuator 21 closes the opening at the top of the pressure chamber 41. The actuator 21 basically extends across the region where all the pressure chambers 41 are arranged. The actuator 21 includes a displacement element 49 for each pressure chamber 41.

The actuator 21 may have any of various known configurations and may be an application of a known configuration. In the illustrated example, the actuator 21 is a so-called unimorph piezoelectric actuator. A specific configuration is described below.

The actuator 21 includes a diaphragm 51, a common electrode 53, a piezoelectric layer 55, and individual electrodes 57, which are stacked in order from the side near the pressure chambers 41. The diaphragm 51, the common electrode 53, and the piezoelectric layer 55 basically extend across the region where all the pressure chambers 41 are arranged. The individual electrodes 57 are provided for each of the pressure chambers 41. The individual electrodes 57, for example, have similar shapes to the planar shapes of the pressure chambers 41 in a planar see-through view, and also overlap the centers of the pressure chambers 41.

The portions of the piezoelectric layer 55 sandwiched between the individual electrodes 57 and the common electrode 53 are polarized in the thickness direction. Therefore, when a voltage is applied between the individual electrodes 57 and the common electrode 53, the piezoelectric layer 55 contracts or expands in directions along the surfaces. This contraction or expansion is restricted by the diaphragm 51, and the displacement elements 49 bend towards the side near the pressure chambers 41 or towards the opposite side like a bimetal. As a result, pressure is applied to the liquid in the pressure chambers 41.

The material and thickness of each layer of the actuator 21 may be chosen as appropriate. For example, the diaphragm 51 and the piezoelectric layer 55 may be, for example, composed of lead zirconate titanate (PZT)-based, $NaNbO_3$-based, $BaTiO_3$-based, $(BiNa)NbO_3$-based, or $BiNaNb_5O_{15}$-based ceramic materials. The common electrode 53 and individual electrodes 57 may be composed of, for example, Ag—Pd-based or Au-based metallic materials.

The common electrode 53, for example, is given a constant potential (reference potential). A drive signal is, for example, input to the individual electrodes 57, as described previously. The method used to drive the displacement elements 49 (or waveform of the drive signal from another point of view) may be chosen as appropriate. For example, the driving method may be a so-called pull-hit method.

(Liquid)

Figure 7:
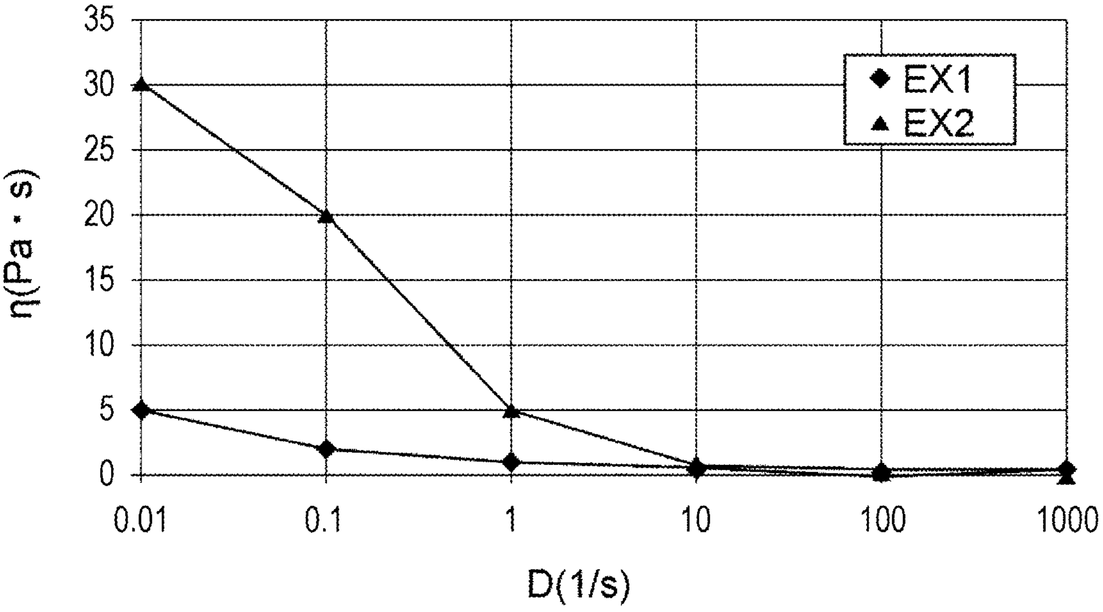
FIG. 7 is diagram illustrating characteristics of a liquid used in the liquid ejecting device according to the embodiment.

FIG. 7 illustrates characteristics of a liquid used in the ejecting device 1. In this figure, the horizontal axis represents shear rate D (1/s). The vertical axis represents viscosity η (Pa·s). EX1 and EX2 represent the characteristics of a first example and a second example of a liquid used in the ejecting device 1.

As illustrated in this figure, the liquid used in the ejecting device 1 is a pseudoplastic fluid. For your information, a pseudoplastic fluid can be described as a non-Newtonian fluid having a viscosity that decreases with increasing shear rate. Shear rate is sometimes referred to as shear velocity, velocity gradient, or strain rate. Shear rate is calculated, for example, by simply dividing the difference in velocity between two positions separated from each other in a direction perpendicular to the flow direction by the distance between the two positions. Viscosity, for example, is conveniently calculated by dividing the shear stress by the shear rate. Shear stress is sometimes referred to as shearing stress. For the sake of simplification, shear stress is calculated by dividing the force required to shift, in the flow direction, two parallel surfaces (of the same area) that are separated from each other in a direction perpendicular to the flow direction by the area of one of the surfaces.

A pseudoplastic fluid can also be said to be a power law fluid where a power exponent p is less than 1 when a viscosity η is approximated using a power law as $\eta = k \times D^{p-1}$. k is the viscosity coefficient and D is the shear rate. Since the viscosity η is a function of D, the viscosity η is sometimes referred to as apparent viscosity.

The liquid used in the ejecting device 1 may have or not have thixotropic properties where the viscosity decreases with increasing time under shear stress.

The specific constituents and/or composition of the pseudoplastic fluid may be various known ones or applications of known ones. For example, inks and paints are typically pseudoplastic fluids. The liquids of the first and second examples, whose properties are illustrated in FIG. 7, are common paints (in other words, paints available on the market). The specific characteristics of the pseudoplastic fluids may also be chosen as appropriate. One example is as follows.

For example, the liquid may have a viscosity from 0.02 Pa·s to 0.4 Pa·s at a shear rate of 1000 $s^{-1}$. In the paint of the first example, whose characteristics are illustrated in FIG. 7, the viscosity is 0.3 Pa·s at a shear rate of 1000 $s^{-1}$. In the paint of the second example, the viscosity is 0.1 Pa·s at a shear rate of 1000 $s^{-1}$. The liquid may have a viscosity from 0.1 Pa·s to 0.3 Pa·s at a shear rate of 1000 $s^{-1}$.

For example, the liquid may have a viscosity from 0.5 Pa·s to 50 Pa·s at a shear rate of 0.01 $s^{-1}$. The paint of the first example, whose characteristics are illustrated in FIG. 7, has a viscosity of 5 Pa·s at a shear rate of 0.01 $s^{-1}$. The paint of the second example has a viscosity of 30 Pa·s at a shear rate of 0.01 $s^{-1}$. The liquid may have a viscosity from 5 Pa·s to 30 Pa·s at a shear rate of 0.01 $s^{-1}$.

For example, the liquid may have a viscosity coefficient k from 1.0 to 1.5 and a power exponent p from 0.35 to 0.65 when the viscosity is approximated using a power law. The paint of the first example has a viscosity coefficient k of 1.0 and a power exponent p of 0.65. The paint of the second example has a viscosity coefficient k of 1.5 and a power exponent p of 0.35. Approximation equations may be specified, for example, using a method of least squares.

(Average Viscosity)

Hereafter, the concept of average viscosity is introduced. Essentially, each minute region inside the flow path has a different value of viscosity. However, it is not necessarily appropriate to use the viscosity of each minute region to set the viscosity of the liquid in the flow path member 19 and additionally it may be difficult to calculate the viscosity of each minute region. Therefore, viscosities averaged over the respective parts of the flow path in the flow path member 19 are referred to as average viscosities. There is one value of average viscosity for each part within the flow path. For example, "the average viscosity of one supply manifold 33" means the average viscosity of the entire one supply manifold 33.

The average viscosity may be calculated, for example, as follows. First, the relationship between the shear rate D and the viscosity η of the liquid used in the ejecting device 1 is identified. Various known methods may be employed or known literature may be referenced in order to make this identification. Next, an approximation equation representing the identified relationship between the shear rate D and the viscosity η is obtained. The approximation equation may be, for example, appropriate equation such as a power law. The fitting method used may be a known method such as the method of least squares. Next, employing a circulation flow rate U ($m^3$/s) as a boundary condition, fluid simulation is performed for each part of the flow path using the above approximation equation and a differential pressure ΔP (Pa) between the upstream end and the downstream end of each part is obtained. Then, an average viscosity μ (Pa·s) is calculated by substituting the circulation flow rate U, the differential pressure ΔP, and the dimensions of each part (m) into a prescribed equation.

An example of the equation used to calculate the average viscosity μ is given below.

The equation for a case where the shape of the flow path is cylindrical with the flow direction being the axial direction of the cylinder is as follows.

$$U=(\pi r^4 \Delta P)/(8\ \mu L) \qquad (1)$$

r is the radius of the cross section. L is the length of the flow path.

The equation for a case where the shape of the flow path is a prismatic (rectangular) cylinder with the flow direction being the axial direction of the cylinder is as follows.

$$U=(w^3 h \Delta P)/(4\ \mu L)\times(16/3-1024/\pi^5\times w/h\times\Sigma(1/q^5\times \tan h(q\pi h/2w))) \qquad (2)$$

q=1, 3, 5, 7, 9 and 11, and Σ is the sum of six lots of $(1/q^5\times\tan h(q\pi h/2w))$ when these six values are substituted as q. w is the flow path width. h is the flow path height. L is the flow path length.

In the reservoirs (29 and 31) and the manifolds (33 and 37), the flow rate U is different on the upstream side and the downstream side. In this case, for example, the highest flow rate, the lowest flow rate, or the average flow rate may be used. The average viscosity in the following description may be assumed to be calculated using any of the above flow rates. When comparing the average viscosities of the reservoirs (29 and 31) and the average viscosities of the manifolds (33 and 37), average viscosities calculated under the same conditions as each other may be compared. For example, average viscosities calculated using the highest flow rates (lowest average viscosities) may be compared to each other, average viscosities calculated using the lowest flow rates (highest average viscosities) may be compared to each other, or average viscosities calculated using the average flow rates (average viscosities) may be compared to each other. For example, the term average viscosity used in the following description may be taken as meaning an average viscosity calculated using the highest flow rate (lowest average viscosity). For example, the average viscosities of the supply reservoir 29 and the supply manifolds 33 may be taken as being calculated using the furthest upstream flow rates. The average viscosities of the collection reservoir 31 and collection manifolds 37 may be taken as being calculated using the furthest downstream flow rates.

In the pressure chamber 41, the pressure chamber body 41*a*, or the descender 41*b*, the direction of liquid flow is not always constant. The average viscosity in these parts in the following description is calculated with a direction of flow from above to below as the flow direction. For example, the average viscosity in the descender 41*b* is calculated with the flow direction being a direction from the pressure chamber body 41*a* to the nozzle 43.

(Average Viscosity in Flow Path Member)

Figure 8:
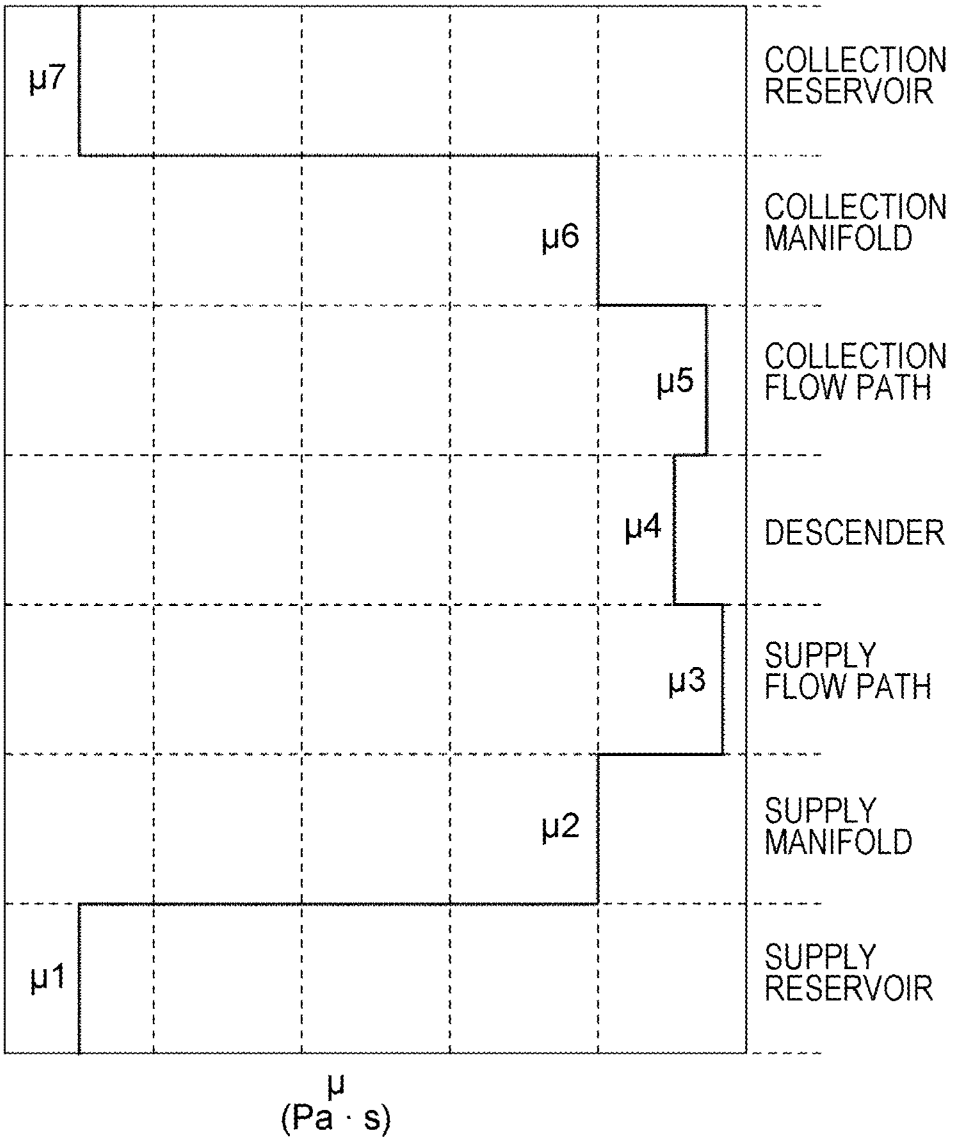
FIG. 8 is a diagram illustrating an example of the average viscosity in various parts of a flow path in the embodiment.

FIG. 8 illustrates an example of the relative relationships between different parts of the flow path of the flow path member 19 with respect to the average viscosities μ of the respective parts of the flow path of the flow path member 19. In this figure, the vertical axis represents the plurality of parts of the flow path of the flow path member 19. The horizontal axis represents the average viscosities μ of the individual parts.

In the figure, an average viscosity μ2 represents the average viscosity μ in one supply manifold 33 out of the plurality of supply manifolds 33. For the other flow paths as well, the average viscosity μ in one flow path is illustrated. An average viscosity μ3 of the supply flow path 39 may be taken as being the average viscosity of either the first supply flow path 39A or the second supply flow path 39B.

In the liquid ejecting device 1, the target flow rate for the circulation flow rate controlled by the flow rate setting unit 13 and the shape and dimensions of the flow path of the flow path member 19 are set so that the relationship between the average viscosities as illustrated in the figure is satisfied. For purposes of this disclosure, the concepts of "shape" and "dimensions" may both be expressed simply as "shape". In other words, the flow path of the flow path member 19 has a flow path shape that satisfies the relationship illustrated in FIG. 8 when the circulation flow rate is equal to the target flow rate. In other words, the circulation flow rate is set to a value such that the relationship between the average viscosities illustrated in FIG. 8 is established for the shape and dimensions of the flow path of the flow path member 19. For example, the circulation flow rate is set to a value such that the average viscosity of the liquid in the supply flow path 39 is less than or equal to half the average viscosity of the liquid in the supply manifold 33 for the shape and dimensions of the flow path of the flow path member 19.

When the circulation flow rate is adjusted via open-loop control, there are large fluctuations in the circulation flow rate caused by the amounts of droplets ejected from the plurality of nozzles 43. In this case, the relationship illustrated in FIG. 8 may be established, for example, for the circulation flow rate at a time when droplets are not being ejected from any of the nozzles 43. In other words, the circulation flow rate at a time when droplets are not being ejected from any of the nozzles 43 in the product being implemented may be specified as the target flow rate of that product. This concept may also be applied to feedback control in which it takes more time for the circulation flow rate to become the target flow rate.

In FIG. 8, the following relationships hold true for the average viscosities, for example The average viscosity μ3 of the liquid in the supply flow path 39 (39A or 39B) may be lower than the average viscosity μ2 of the liquid in the supply manifold 33. More specifically, for example, the average viscosity μ3 may be less than or equal to ½, ⅓, or ⅕ the average viscosity μ2.

In this case, for example, the liquid can be smoothly supplied from the supply flow path 39 to the pressure chamber 41 because the average viscosity μ3 of the liquid in the supply flow path 39 is low. In addition, since the average viscosity μ2 is high in the supply manifold 33, pressure waves are easily attenuated. As a result, the likelihood of pressure waves that have leaked from the pressure chamber 41 to the supply manifold 33 via the supply flow path 39 propagating to another pressure chamber 41 via another supply flow path 39 is reduced. In other words, so-called fluid crosstalk can be reduced.

A relationship the same as or similar to that described above may be established between the collection flow path 45 and the collection manifold 37. That is, an average viscosity μ5 of the liquid in the collection flow path 45 may be lower than an average viscosity μ6 of the liquid in the collection manifold 37. More precisely, for example, the average viscosity μ5 may be less than or equal to ½, ⅓, or ⅕ the average viscosity μ6. In this case, effects the same as or similar to those described above are achieved.

The average viscosity μ2 of the supply manifold 33 may be lower than an average viscosity μ1 of the supply reservoir 29. More particularly, for example, the average viscosity μ2 may be less than or equal to ½, ⅓, or ¼ the average viscosity μ1.

In this case, for example, the low average viscosity μ2 of the liquid inside the supply manifold 33 enables the liquid to be supplied smoothly from the supply manifold 33 to the supply flow path 39. In addition, the high viscosity inside the supply reservoir 29 makes it more likely for pressure waves to be attenuated, and consequently crosstalk caused by the propagation of pressure waves through the supply reservoir 29 can be reduced.

A relationship the same as or similar to that described above may be established between the collection manifold 37 and the collection reservoir 31. That is, the average viscosity μ6 of the liquid in the collection manifold 37 may be lower than an average viscosity μ7 of the liquid in the collection reservoir 31. More precisely, for example, the average viscosity μ6 may be less than or equal to ½, ⅓, or ⅕ the average viscosity μ7. In this case, effects the same as or similar to those described above are achieved.

An average viscosity μ4 of the descender 41*b* may be higher than the average viscosity μ5 of the collection flow path 45. More specifically, for example, the average viscosity μ4 may be greater than or equal to 1.5 times the average viscosity μ5.

In this case, for example, the higher the viscosity, the greater the resistance to the movement of bubbles, and therefore the likelihood that a bubble that has entered the descender 41*b* from the nozzle 43 can be collected from the collection flow path 45 is higher.

A relationship the same as or similar to that described above may be established between the descender 41*b* and the supply flow path 39. That is, the average viscosity μ4 of the descender 41*b* may be higher than the average viscosity μ3 of the supply flow path 39. More specifically, for example, the average viscosity μ4 may be greater than or equal to 1.5 times or 2 times the average viscosity μ3.

In this case, for example, the low average viscosity μ3 of the supply flow paths 39 enables the liquid to be smoothly supplied to the descender 41*b*. As a result, for example, the likelihood of the liquid not being supplied to the descender 41*b* in time due to continuous ejection of the liquid is reduced.

The average viscosity μ2 of the supply manifold 33 may be higher than the average viscosities (μ3, μ4, and μ5) of the individual flow path 35 (excluding the pressure chamber body 41*a*). More particularly, for example, the average viscosity μ2 may be greater than or equal to 1.5 times any of the average viscosities μ3, μ4 and μ5.

In this case, for example, the liquid can be supplied smoothly to the nozzle 43 due to the low average viscosity μ of the individual flow path 35. In addition, the high average viscosity μ of the supply manifold 33 causes leaking of pressure from the individual flow path 35 into the supply manifold 33 to be rapidly attenuated. Therefore, fluid crosstalk is unlikely to occur.

A relationship the same as or similar to that described above may be established between the collection manifold 37 and the individual flow path 35. That is, the average viscosity μ6 of the liquid in the collection manifold 37 may be higher than the average viscosities (μ3, μ4, and μ5) of the individual flow path 35. More precisely, for example, the average viscosity μ6 may be greater than or equal to 1.5 times any of the average viscosities μ3, μ4 and μ5. In this case, effects the same as or similar to those described above are achieved.

(Example of Values of Average Viscosities and so Forth)

There are countless combinations of liquid characteristics, circulation flow rates, flow path shapes and dimensions, and so forth with which the above relationship between average viscosities μ may be realized, and the combination may be chosen as appropriate in accordance with the specific technical field to which the ejecting device 1 is to be applied. An example of the values when a common paint is used, as described with reference to FIG. 7, is described below.

The circulation flow rate may be, for example, from 50 ml/min to 300 ml/min. The pressure in the nozzles 43 when liquid is not being ejected may be ±2 kPa with respect to atmospheric pressure (around 100 kPa). The differential pressure between the supply port 3*b* and the collection port 3*c* may be from 40 kPa to 160 kPa.

The supply reservoir 29 and the collection reservoir 31 may each have a width w from 4 mm to 20 mm, a height h from 3 mm to 15 mm, and a length L from 200 mm and 800 mm. The supply manifolds 33 and the collection manifolds 37 may each have a width w from 0.2 mm to 2 mm, a height h from 0.5 mm to 6 mm, and a length L from 5 mm to 20 mm. The first supply flow paths 39A may have a width w and a height h from 50 μm to 200 μm. The second supply flow paths 39B may have a width w from 50 μm to 200 μm and a height h from 25 μm to 200 μm. The collection flow paths 45 may have a width w from 70 μm to 200 μm and a height h from 80 μm to 200 μm. The length L of the supply flow paths 39 and the collection flow paths 45 may be from 300 μm to 1500 μm. The descenders 41*b* may have a radius r from 50 μm to 250 μm and a length L from 0.5 mm to 2 mm. The nozzles 43 may have a radius r from 5 μm to 50 μm.

An example of estimation of the average viscosities μ under the above conditions is described below. The average viscosity μ in the descenders 41*b* was calculated using Equation (1) and the average viscosities μ of the other flow paths was calculated using Equation (2). The average viscosity μ in the supply reservoir 29 and the collection reservoir 31 is from 0.4 Pa·s to 2 Pa·s. The average viscosity μ in the supply manifold 33 and the collection manifold 37 is from 0.1 Pa·s to 0.4 Pa·s. The average viscosity μ in the supply flow paths 39 and the collection flow paths 45 is from 0.01 Pa·s to 0.1 Pa·s. The average viscosity μ in the descenders 41*b* is from 0.05 Pa·s to 0.2 Pa·s.

(Fluid Resistance)

The fluid resistance (N−s/m5) in the flow path member 19 may be set as appropriate. For example, the fluid resistance may be set so that both Condition 1 and Condition 2 below are satisfied.

The sum of $(1/2)\times R_r\times U(1+1/m)$ and $(1/2)\times R_m\times(U/m)\times(1+1/n)$ is smaller than $2\sigma/r$. Condition 1:

$R_r<1/10\times R_m\times(1/m)$ Condition 2:

$R_r$ is the fluid resistance of the liquid in the supply reservoir 29. $R_m$ is the fluid resistance of the liquid in the supply manifolds 33. m is the number of supply manifolds 33 connected to the supply reservoir 29. n is the number of individual flow paths 35 (nozzles 43) per supply manifold 33. U is the flow rate ($m^3$/s) of the liquid flowing into the supply reservoir 29. σ is the surface tension (N/m) of the liquid. r is the radius (m) of each nozzle 43.

Here, the supply manifolds 33 to which only dummy individual flow paths not capable of ejecting droplets are connected are ignored. It is also assumed that the same number of nozzles 43 are connected to each supply manifold 33. It is also assumed that the pitch of the plurality of supply manifolds 33, the distance from the upstream end of the supply reservoir 29 to the first supply manifold 33, and the distance from the final supply manifold 33 to the downstream end of the supply reservoir 29 are equal to each other.

$(1/2)\times R_r\times U(1+1/m)$ in Condition 1 corresponds to a pressure drop inside the supply reservoir 29 (pressure difference between upstream side and downstream side). Specifically, the pressure drop from the upstream end of the supply reservoir 29 to the first supply manifold 33 is calculated as $U\times R_r/m$, and the pressure drop from the first supply manifold 33 to the second supply manifold is calculated as $(U-U/m)\times R_r/m$. $(1/2)\times R_r\times U(1+1/m)$ given above is then obtained from $U\times R_r/m+(U-U/m)\times R_r/m+\ldots+U/m\times R_r/m$, which is the sum of the pressure drops from the upstream end to the downstream end.

$(1/2)\times R_m\times(U/m)\times(1+1/n)$ in Condition 1 corresponds to the pressure drop (pressure difference between the upstream end and the downstream end) in one supply manifold 33. This equation is obtained in the same way or in a similar way to the pressure drop in the supply reservoir 29 described above. That is, in the equation for the supply reservoir 29, a fluid resistance $R_r$ of the supply reservoir 29 is replaced by a fluid resistance $R_m$ of the supply manifolds 33, a flow rate U into the supply reservoir 29 is replaced by a flow rate U/m of liquid into the supply manifolds 33, and the number m of supply manifolds 33 is replaced by replaced by the number n of nozzles 43.

The sum of $(1/2)\times R_r\times U(1+1/m)$ and $(1/2)\times R_m\times(U/m)\times(1+1/n)$ in Condition 1 roughly corresponds to the difference in pressure between the most upstream individual flow path 35 and the most downstream individual flow path 35. The most upstream individual flow path 35 is the individual flow path 35 connected furthest upstream to the supply manifold 33 that is connected furthest upstream to the supply reservoir 29. The most downstream individual flow path 35 is the individual flow path 35 connected furthest downstream to the supply manifold 33 that is connected to furthest downstream to the supply reservoir 29. The pressure drops in the individual flow paths 35 are substantially identical among the plurality of individual flow paths 35 and therefore the above sum is equivalent to the pressure difference across all the nozzles 43 (the difference in pressure between the nozzle 43 having the highest pressure and the nozzle 43 having the lowest pressure).

In addition, when the above sum is smaller than 2σ/r, it is easy to maintain the meniscus under atmospheric pressure in all the nozzles 43. As has already been described with respect to Condition 1, the supply manifolds 33 to which only dummy individual flow paths are connected and the dummy individual flow paths may be ignored. The number of individual flow paths 35 connected to the most upstream supply manifold 33 or the most downstream supply manifold 33, and so forth, may be less than that for the other supply manifolds 33. In this case, for example, the most upstream supply manifold 33 or the most downstream supply manifold 33 may be ignored, or alternatively, it may be assumed that the most upstream supply manifold 33 or the most downstream supply manifold 33 has the same number of individual flow paths 35 connected thereto as the other supply manifolds 33.

Condition 2 represents the relationship between the fluid resistance $R_r$ of the supply reservoir 29 and the fluid resistance $R_m$ of the supply manifolds 33. Since the flow rate of the fluid flowing into the supply manifolds 33 is 1/m of the flow rate of the fluid flowing into the supply reservoir 29, the fluid resistance $R_r$ is compared to the fluid resistance $R_m$ by multiplying the fluid resistance $R_m$ by 1/m. Condition 2 being satisfied means that the fluid resistance $R_r$ of the supply reservoir 29 is very small compared to the fluid resistance $R_m$ of the supply manifolds 33.

For example, in the technologies of the related art, $R_r$ is around ⅕ of $R_m\times(1/m)$. On the other hand, in this embodiment, $R_r$ may be greater than or equal to 1/40 of $R_m\times(1/m)$ and less than 1/10 of $R_m\times(1/m)$. Of course, in this embodiment, $R_r$ may be around ⅕ of $R_m\times(1/m)$, similarly to as in the technologies of the related art.

As a result of Condition 2 being satisfied, for example, the liquid readily flows from the supply reservoir 29 to the positions of the plurality of supply manifolds 33 and differences in flow rate between the plurality of supply manifolds 33 are reduced. Accordingly, the liquid can be stably supplied to all the supply manifolds 33.

In addition to Conditions 1 and 2, the fluid resistance may be set so that Condition 3 below is satisfied.

$$R_m<1/10\times R_n\times(1/n) \qquad \text{Condition 3:}$$

$R_n$ is the fluid resistance in the nozzles 43.

Condition 3 represents the relationship between the fluid resistance $R_m$ of the supply manifolds 33 and the fluid resistance of the individual flow paths 35. However, since the fluid resistance $R_n$ of the nozzles 43 is much greater than the fluid resistance of the other parts of the individual flow paths 35, the fluid resistance of the individual flow paths 35 is approximated by the fluid resistance $R_n$ of the nozzles 43. Since the flow rate of the liquid flowing into the individual flow paths 35 is 1/n of the flow rate of the liquid flowing into the supply manifolds 33, the fluid resistance $R_m$ is compared to the fluid resistance $R_n$ by multiplying the fluid resistance $R_n$ by 1/n.

Condition 3 being satisfied means that the fluid resistance $R_m$ of the supply manifolds 33 is very small compared to the fluid resistance $R_n$ of the nozzles 43. For example, in technologies of the related art, $R_m$ is approximately ⅙ of $R_n\times(1/n)$ Similarly to as in the technologies of the related art, $R_m$ may be around ⅙ of $R_n\times(1/n)$. For example, $R_m$ may be set to be from ⅒ to ¼ of $R_n\times(1/n)$.

As a result of Condition 3 being satisfied, for example, the liquid readily flows from the supply manifolds 33 to the positions of the plurality of individual flow paths 35 and differences in flow rate between the plurality of individual flow paths 35 are reduced. Accordingly, the liquid can be supplied stably to all the individual flow paths 35.

The example of the dimensions and so forth of a flow path illustrated in FIG. 8, serving as an example of the dimensions that realize the average viscosities, may be referred to as an example of dimensions and so forth of a flow path for which Conditions 1 to 3 are satisfied.

(Variation 1)

Figure 9:
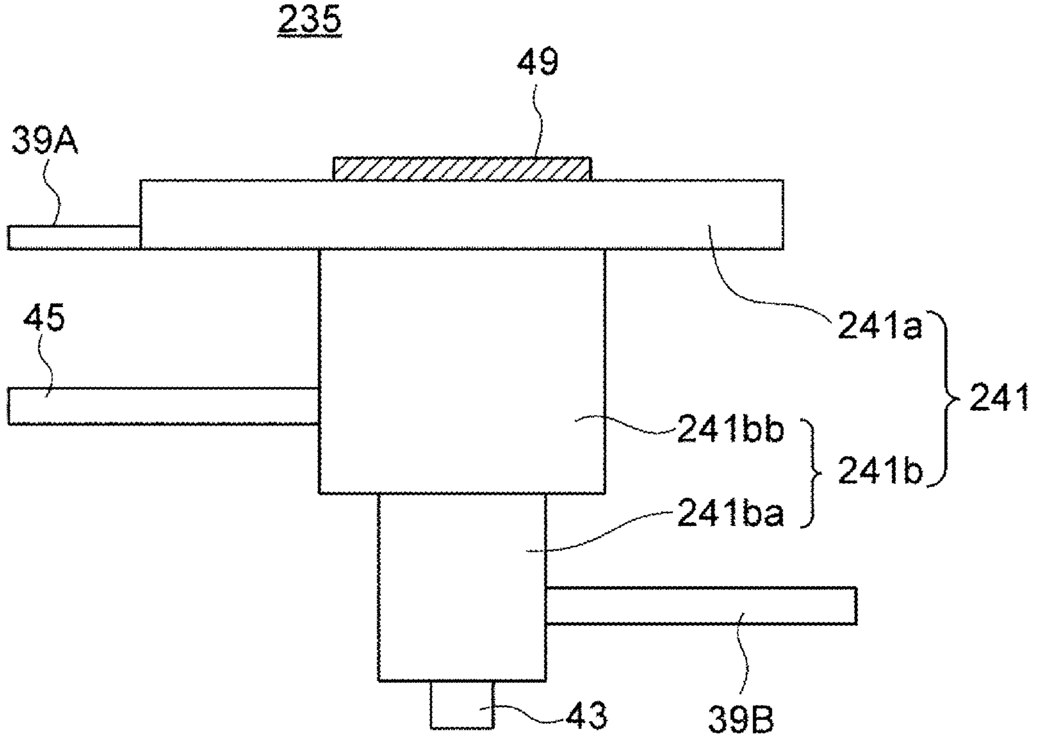
FIG. 9 is a schematic cross-sectional view of an individual flow path according to a first variation.

FIG. 9 is a schematic cross-sectional view of an individual flow path 235 according to a first variation.

A pressure chamber 241 of the individual flow path 235 includes a pressure chamber body 241*a* and a descender 241*b*, the same as or similar to the pressure chamber 41 of the embodiment. However, the descender 241*b* has a first portion 241*ba* and a second portion 241*bb*, which have different cross-sectional areas from each other.

The first portion 241*ba* is connected to the nozzle 43. The second portion 241*bb* is connected to the pressure chamber body 241*a*. In other words, the second portion 241*bb* is a portion located nearer the pressure chamber body 241*a* than the first portion 241*ba*. The cross-sectional area of the second portion 241*bb* is larger than that of the first portion 241*ba*.

The average viscosities of the first portion 241*ba* and the second portion 241*bb* are different from each other as a result of the first portion 241*ba* and the second portion 241*bb* having different cross-sectional areas from each other, for example. For example, the average viscosity of the liquid in the second portion 241*bb* is higher than the average viscosity of the liquid in the first portion 241*ba*. In other words, the average viscosity in the descender 241*b* increases in a stepwise manner with increasing closeness to the pressure chamber body 41*a* from the nozzle 43. The average viscosity may increase not only in one step but also in two or more steps. In other words, the descender may include a third portion and so on, in addition to the first and second portions.

When the average viscosity of the second portion 241*bb*, which is located nearer the pressure chamber body 241*a* than the first portion 241*ba*, is higher than the average viscosity of the first portion 241*ba* as in the first variation, for example, bubbles that have entered the descender 241*b* from the nozzle 43 have greater difficulty in moving towards the pressure chamber body 241*a*. Consequently, the likelihood of bubbles remaining in the pressure chamber body 241*a* and resulting in deterioration of the ejection characteristics is reduced.

In the case where at least one of two flow paths whose average viscosities are to be compared has a portion having a different shape, the average viscosities of the parts where the two flow paths contact each other may be compared with each other. For example, when comparing the average viscosity of the collection flow path 45 and the average viscosity of the descender 241*b* in the individual flow path 235 of this first variation, the average viscosity of the second portion 241*bb*, which is directly connected to the collection flow path 45, may be used for the purpose of comparison rather than the average viscosity of the entire descender 241*b*. This is because the average viscosity of the second portion 241*bb* has the greater effect on the flow between the collection flow path 45 and the descender 241*b*.

(Variation 2)

Figure 10:
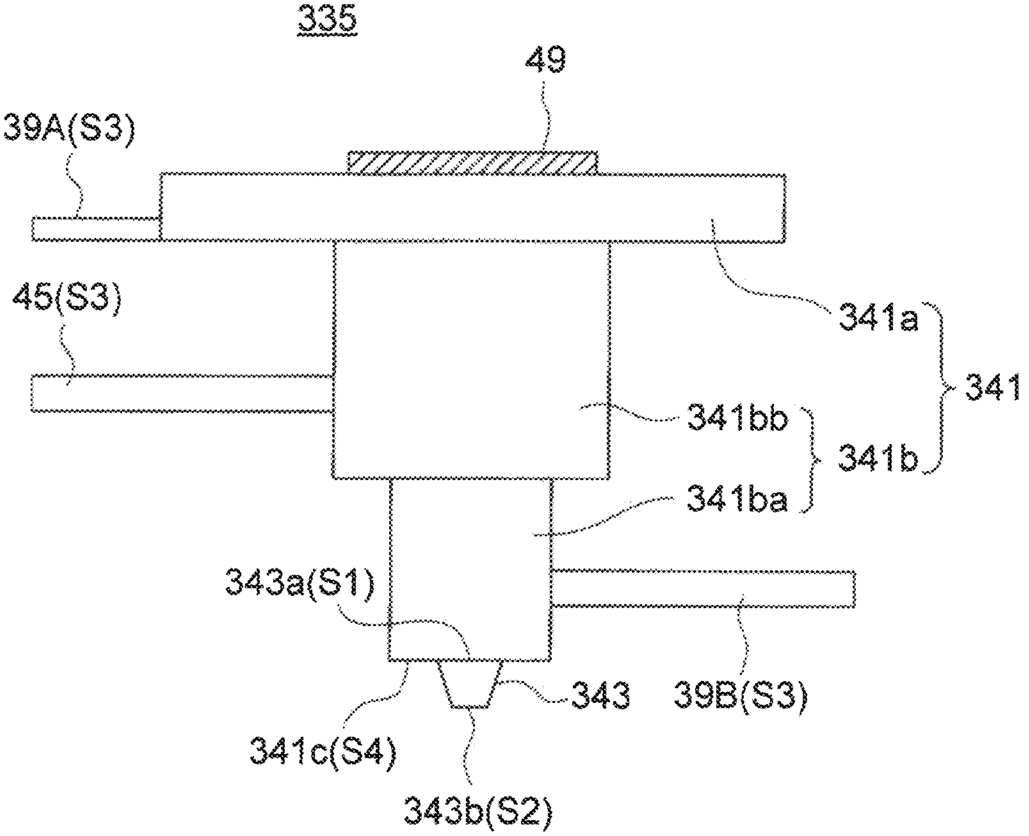
FIG. 10 is a schematic cross-sectional view of an individual flow path according to a second variation.

FIG. 10 is a schematic cross-sectional view of the individual flow path 335 in an embodiment. The individual flow path 335 includes a nozzle 343 with a first shape, while the individual flow path 235 in FIG. 9 includes the nozzle 343 with a second shape. The first shape is different from the second shape, and is otherwise the same.

The nozzle 343 includes an inflow surface 343*a* and a discharge surface 343*b*. The inflow surface 343*a* is perpendicular to the flow direction of the liquid. The nozzle 343 may have a reverse-tapered shape. Here, a cross-sectional area of the inflow surface 343*a* is defined as S1, and a cross-sectional area of the discharge surface 343*b* is defined as S2. Then, an equation of S1>S2 is satisfied. That is, S1 is larger than S2.

The liquid may have a high shear rate when passing through the discharge surface 343*b* due to small S2. The liquid passing through at the discharge surface 343*b*, therefore, may have a low viscosity and is discharged efficiently from the nozzle 343. In contrast, the liquid may have a low shear rate when passing through the inflow surface 343*a* due to large S1. The liquid passing through the inflow surface 343*a*, therefore, may have a high viscosity, and is hard to flow backward from the nozzle 343 to the pressure chamber body 341*a* when the liquid is drawn into the pressure chamber body 341*a* from the supply flow paths 39 A and/or 39 B. As a result, the individual flow paths 335 are less likely to be short of liquid supply.

The nozzle 343 has a reverse-tapered shape in FIG. 10, but the shape is not limited to the reverse-tapered shape. For example, the flow path in the nozzle 343 may include a first flow path with a first diameter, and a second flow path with a second diameter that is different from the first diameter. The second path is closer to the discharge surface 343*b* than the first path. Therefore, the flow path in the nozzle 343 includes a step between the first path and the second path.

The pressure chamber 341 includes a pressure chamber body 341*a* and a descender 341*b*. S4 is larger than S3 where S3 is defined as a cross-sectional area of the individual flow path 335 at the inflow surface 343*a* that is perpendicular to a flow direction of the liquid in the supply flow paths 39A and 39B or the recovery flow path 45, and S4 is defined as a cross-sectional area of the individual flow path 335 at an outflow surface 343*c* that is perpendicular to the flow direction of the liquid at the descender 341*b* (first site 341*ba*) just above the nozzle 343. Then, an equation of S4>S3 is satisfied. That is, S4 is larger than S3.

Having such a configuration, the liquid in the nozzle may not be dried out during a non-ejection state of the liquid in the individual flow passage 335. More specifically, in the individual flow path 335, the shear rate of the liquid flowing through the outflow surface 343*c* is lowed while the viscosity of the liquid is high because S4 is large. Then, the liquid in the vicinity of the outflow surface 343*c* of the first site 341*ba* is pulled by the liquid flowing into the first site 341*ba* from the supply passage 39B. As a result, the liquid in the nozzle 343 can be forced to swing so that the nozzle 343 may not be dried out.

The individual flow paths 335 may satisfy S4>S3 if, for example, S4 is larger than S3 of the supply flow paths 39A or 39B, or if S4 is larger than the supply flow paths 39A and 39B. It may also be larger than S4 of the recovery channel 45. Alternatively, S4 may be greater than S3 of the sum of the supply channels 39A, 39 B and the recovery channel 45.

S3>S1 is satisfied in the individual flow path 335. The large S3 lowers the shear rate of the liquid flowing through the supply channels 39A and 39B, and the recovery channel 45. This increases the viscosity of the liquid flowing through the supply channels 39A and 39 B, and the recovery channel 45, which tends to cause pressure damping in the supply channels 39 A and 39 B, and the recovery channel 45. As a result, the pressure wave generated in the pressure chamber body 341*a* becomes difficult to exit the individual flow path 335 through the supply channels 39 A and 39 B, and the recovery channel 45. Therefore, the fluid crosstalk can be improved.

Similarly, S3>S2 may also be satisfied in the individual flow path 335. The large S3 lowers the shear rate of the liquid flowing through the supply channels 39A and 39B, and the recovery channel 45. This increases the viscosity of the liquid flowing through the supply channels 39 A and 39 B, and the recovery channel 45, which tends to cause pressure damping in the supply channels 39 A and 39 B and the recovery channel 45. As a result, the pressure wave generated in the pressure chamber body 341*a* becomes difficult to exit the individual flow path 335 through the supply channels 39 A and 39 B and the recovery channel 45. Therefore, the fluid crosstalk can be improved.

In some embodiments, cross-sectional areas S1, S2, S3 and S4 of the individual flow path 335 are as follows. S1 is from 0.001 to 0.01 $mm^2$. S2 is 0.0001 to 0.01 $mm^2$. S3 is from 0.001 to 0.5 $mm^2$. S4 is from 0.01 to 1 $mm^2$.

The technologies described in the present disclosure are not limited to the above embodiments and variations, and may be implemented in various forms.

For example, the liquid ejecting device is not restricted to being a piezoelectric-type liquid ejecting device that applies pressure to a liquid through means of a piezoelectric body. The liquid ejecting device may be a thermal-type liquid ejecting device that generates bubbles within the liquid by heating the liquid and applies pressure to the liquid accompanying the generation of these bubbles in order to eject droplets.

The flow paths may have various configurations other than those illustrated in the figures. For example, individual flow paths that are adjacent to each other may share common portions with each other. For example, portions of the collection flow paths on the side where the collection manifolds are located may be shared among the individual flow paths adjacent to each other.

The average viscosities may also be set in a different manner from that described in the embodiment. For example, the average viscosity μ3 of the supply flow path 39 may, in contrast to the embodiment, be larger than the average viscosity μ5 of the collection flow path 45 or may be 1.5 times higher. In this case, the liquid inside the descender 41*b* will be less likely to flow backwards (i.e., less likely to flow in the opposite direction from the circulation direction) during ejection of droplets. In addition, the liquid and/or bubbles are more likely to flow into the collection flow path.

REFERENCE SIGNS

1 . . . liquid ejecting device,
3 . . . head,
13 . . . flow rate setting unit,
19 . . . flow path member,
21 . . . actuator,
29 . . . supply reservoir,
31 . . . collection reservoir,
33 . . . supply manifold,
37 . . . collection manifold,
39 . . . supply flow path,
41 . . . pressure chamber,
43 . . . nozzle,
45 . . . collection flow path.

The invention claimed is:

1. A device comprising:

a flow path member including a flow path configured to direct flow of a pseudoplastic liquid through the flow path member, wherein the flow path includes
a supply reservoir,
a plurality of supply manifolds connected to the supply reservoir, and
a plurality of pressure chambers connected in a one-to-one manner to a plurality of supply flow paths, an actuator configured to apply pressure to the liquid in the plurality of pressure chambers to cause droplets to be ejected from a plurality of nozzles connected in a one-to-one manner to the plurality of pressure chambers;

a pump configured to cause the liquid to flow sequentially through the supply reservoir, the plurality of supply manifolds, the plurality of supply flow paths, and the plurality of pressure chambers; and a controller configured to adjust a flow rate of the liquid to a prescribed target flow rate;

wherein the flow path has a flow path shape in which an average viscosity of the liquid in the plurality of supply flow paths is less than or equal to half an average viscosity of the liquid in the plurality of supply manifolds when the flow rate is equal to the target flow rate.

2. The device according to claim 1, wherein the flow path has a flow path shape in which an average viscosity of the liquid in the plurality of supply manifolds is less than or equal to half an average viscosity of the liquid in the supply reservoir when the circulation flow rate is equal to the target flow rate.

3. The device according to claim 1, further comprising a plurality of collection flow paths connected in a one-to-one manner to the plurality of pressure chambers; and a pump configured to sequentially circulate the liquid through the supply reservoir, the plurality of supply manifolds, the plurality of supply flow paths, the plurality of pressure chambers, the plurality of collection flow paths, the plurality of collection manifolds, and the collection reservoir;

the plurality of pressure chambers each include:

a pressure chamber body to which pressure is applied by the actuator, and a descender that connects the pressure chamber body to the corresponding nozzle, the plurality of collection flow paths are connected to the descenders, and the flow path has a flow path shape in which an average viscosity of the liquid in the descenders is greater than or equal to 1.5 times an average viscosity of the liquid in the plurality of collection flow paths when the circulation flow rate is equal to the target flow rate.

4. The device according to claim 3, wherein S4 is larger than S3, where S3 is defined as a first cross-sectional area of an inflow surface perpendicular to a flow direction of the liquid in a supply channel or a recovery channel, and S4 is defined as a second cross-sectional area of an outflow surface of the descender just above the nozzle, the second cross-sectional area perpendicular to the flow direction of the liquid.

5. The device according to claim 3, wherein S3 is larger than S1, where S1 is defined as a cross-sectional area of an inflow surface perpendicular to a flow direction of the liquid in the nozzle, and S3 is defined as a cross-sectional area of the inflow surface perpendicular to a flow direction of the liquid in a supply channel or a recovery channel.

6. The device according to claim 3, wherein S3 is larger than S2, where S2 is defined as a cross-sectional area of a discharge surface perpendicular to a flow direction of the liquid in the nozzle, and S3 is defined as a cross-sectional area of an inflow surface perpendicular to the flow direction of the liquid in a supply channel or a recovery channel.

7. The device according to claim 1, further comprising a plurality of collection flow paths connected in a one-to-one manner to the plurality of pressure chambers; and a pump configured to sequentially circulate the liquid through the supply reservoir, the plurality of supply manifolds, the plurality of supply flow paths, the plurality of pressure chambers, the plurality of collection flow paths, the plurality of collection manifolds, and the collection reservoir;

the plurality of pressure chambers each include:

a pressure chamber body to which pressure is applied by the actuator, and a descender that connects the pressure chamber body to the corresponding nozzle, the plurality of collection flow paths are connected to the descenders, the descenders each include:

a first portion, and a second portion located nearer the pressure chamber body than the first portion, and the flow path has a flow path shape in which an average viscosity of the liquid in the second portion is higher than an average viscosity of the liquid in the first portion when the circulation flow rate is equal to the target flow rate.

8. The device according to claim 1, wherein where $R_r$ is a fluid resistance of the liquid in the supply reservoir, $R_m$ is a fluid resistance of the liquid in the supply manifolds, m is number of supply manifolds connected to the supply reservoir, n is number of nozzles for each supply manifold, U is a flow rate of the liquid flowing into the supply reservoir, σ is a surface tension of the liquid, and r is a radius of the nozzles, $$a \text{ sum of } (1/2)\times R_r\times U(1+1/m) \text{ and } (1/2)\times R_m\times(U/m)\times(1+1/n) \text{ is smaller than } 2\sigma/r,$$

and $$R_r<1/10\times R_m\times(1/m).$$

9. The device according to claim 8, wherein where $R_n$ is a fluid resistance of the liquid in the nozzles, $R_m<1/10\times R_n\times(1/n)$.

10. A method using the device according to claim 1, comprising:

circulating a pseudoplastic fluid whose viscosity at a shear rate of 1000 $s^{-1}$ is from 0.02 Pa·s to 0.4 Pa·s and whose viscosity at a shear rate of 0.01 $s^{-1}$ is from 0.5 Pa·s to 50 Pa·s through the flow path.

11. The device according to claim 1, wherein the pump is a vacuum pump.

12. The device according to claim 1, wherein the target flow rate is greater than or equal to 50 mL/min and less than or equal to 300 mL/min.

13. The device according to claim 1, wherein S1 is larger than S2, where S1 is defined as a cross-sectional area of an inflow surface perpendicular to a flow direction of the liquid in the nozzle, and S2 is defined as a cross-sectional area of a discharge surface perpendicular to the flow direction of the liquid in the nozzle.

14. A device comprising:

a flow path member including a flow path configured to direct flow of a pseudoplastic liquid through the flow path member, wherein the flow path includes a supply reservoir from which the liquid is supplied, a plurality of supply manifolds connected to the supply reservoir and to which the liquid is supplied from the supply reservoir, a plurality of supply flow paths, two or more of which are provided for each of the plurality of supply manifolds, each supply flow path among the plurality of supply flow paths being connected to a corresponding one of the plurality of supply manifolds, and the liquid being supplied to the plurality of supply flow paths from the supply manifolds connected thereto, a plurality of pressure chambers connected in a one-to-one manner to the plurality of supply flow paths, supplied with the liquid from the plurality of supply flow paths, a plurality of collection flow paths connected in a one-to-one manner to the plurality of pressure chambers and configured to collect the liquid from the plurality of pressure chambers, a plurality of collection manifolds each connected to two or more of the plurality of collection flow paths and configured to collect the liquid from the plurality of collection flow paths, and a collection reservoir that is connected to the plurality of collection manifolds and is configured to collect the liquid from the plurality of collection manifolds;

an actuator configured to apply pressure to the liquid in the plurality of pressure chambers to cause droplets to be ejected from a plurality of nozzles connected in a one-to-one manner to the plurality of pressure chambers;

a tank configured to store a portion of the liquid, the tank connected to the supply reservoir and separately connected to the collection reservoir;

a pump configured to sequentially circulate the liquid through the supply reservoir, the plurality of supply manifolds, the plurality of supply flow paths, the plurality of pressure chambers, the plurality of collection flow paths, the plurality of collection manifolds, and the collection reservoir; and a controller configured to adjust a circulation flow rate of the liquid to a prescribed target flow rate;

a moving unit configured to relatively move at least one of the flow path member or an object surface such that droplets ejected from the plurality of nozzles move toward the object surface;

wherein the flow path has a flow path shape in which an average viscosity of the liquid in the plurality of supply flow paths is less than or equal to half an average viscosity of the liquid in the plurality of supply manifolds when the circulation flow rate is equal to the target flow rate.

15. A method comprising:

circulating a pseudoplastic liquid through a flow path member, the flow path member including a supply reservoir, a plurality of supply manifolds connected to the supply reservoir, a plurality of supply flow paths, two or more of which are connected to each of the plurality of supply manifolds, a plurality of pressure chambers connected in a one-to-one manner to the plurality of supply flow paths, a plurality of collection flow paths connected in a one-to-one manner to the plurality of pressure chambers, a plurality of collection manifolds each connected to two or more of the plurality of collection flow paths, and a collection reservoir that is connected to the plurality of collection manifolds applying pressure to the liquid in the plurality of pressure chambers to cause droplets to be ejected from a plurality of nozzles connected in a one-to-one manner to the plurality of pressure chambers;

adjusting a circulation flow rate of the liquid to a target flow rate at which an average viscosity of the liquid in the plurality of supply flow paths is less than or equal to half an average viscosity of the liquid in the plurality of supply manifolds.

16. The method of claim 15, further comprising:

moving at least one of the flow path member or an object surface such that droplets ejected from the plurality of nozzles move toward the object surface.

17. The method according to claim 15, wherein an average viscosity of the liquid in the plurality of supply manifolds is less than or equal to half an average viscosity of the liquid in the supply reservoir at the target flow rate.

18. The method according to claim 15, wherein the plurality of pressure chambers each include:

a pressure chamber body to which pressure is applied by the actuator, and a descender that connects the pressure chamber body to the corresponding nozzle, the plurality of collection flow paths are connected to the descenders, and an average viscosity of the liquid in the descenders is greater than or equal to 1.5 times an average viscosity of the liquid in the plurality of collection flow paths at the target flow rate.

19. The method according to claim 15, wherein the plurality of pressure chambers each include:

a pressure chamber body to which pressure is applied by the actuator, and a descender that connects the pressure chamber body to the corresponding nozzle, the plurality of collection flow paths are connected to the descenders, the descenders each include:

a first portion, and a second portion located nearer the pressure chamber body than the first portion, and an average viscosity of the liquid in the second portion is higher than an average viscosity of the liquid in the first portion at the target flow rate.

20. The method according to claim 15, wherein where $R_r$ is a fluid resistance of the liquid in the supply reservoir, $R_m$ is a fluid resistance of the liquid in the supply manifolds, m is number of supply manifolds connected to the supply reservoir, n is number of nozzles for each supply manifold, U is a flow rate of the liquid flowing into the supply reservoir, σ is a surface tension of the liquid, and r is a radius of the nozzles, a sum of $(1/2)\times R_r\times U(1+1/m)$ and $(1/2)\times R_m\times(U/m)\times(1+1/n)$ is smaller than $2\sigma/r$;

and $$R_r<1/10\times R_m\times(1/m).$$

21. The device according to claim 20, wherein where $R_n$ is a fluid resistance of the liquid in the nozzles, $R_m<1/10\times R_n\times(1/n)$.

22. The method according to claim 15, wherein the pseudoplastic fluid has a viscosity from 0.02 Pa·s to 0.4 Pa·s at a shear rate of 1000 $s^{-1}$ and a viscosity from 0.5 Pa·s to 50 Pa·s at a shear rate of 0.01 $s^{-1}$.

23. The method according to claim 15, wherein the target flow rate is greater than or equal to 50 mL/min and less than or equal to 300 mL/min.

* * * * *